(12) United States Patent
Kohgo

(10) Patent No.: US 12,506,967 B2
(45) Date of Patent: Dec. 23, 2025

(54) DISPLAY TERMINAL, COMMUNICATION SYSTEM, DISPLAY METHOD, AND RECORDING MEDIUM WHICH DISPLAYS AN IMAGE OF PREDETERMINED AREA IN A WIDE VISUAL FIELD IMAGE AND THE WIDE VISUAL FIELD IMAGE

(71) Applicant: Maako Kohgo, Tokyo (JP)

(72) Inventor: Maako Kohgo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/597,927

(22) Filed: Mar. 7, 2024

(65) Prior Publication Data
US 2024/0323537 A1  Sep. 26, 2024

(30) Foreign Application Priority Data

Mar. 23, 2023 (JP) ................................. 2023-046364
Dec. 26, 2023 (JP) ................................. 2023-219746

(51) Int. Cl.
*H04N 23/698* (2023.01)
*G06T 3/12* (2024.01)
*H04N 5/262* (2006.01)

(52) U.S. Cl.
CPC ............ *H04N 23/698* (2023.01); *G06T 3/12* (2024.01); *H04N 5/2628* (2013.01)

(58) Field of Classification Search
CPC ..................................... G06T 3/12; G06T 3/08
See application file for complete search history.

(56) References Cited

U.S. PATENT DOCUMENTS

| | | | |
|---|---|---|---|
| 5,023,725 A * | 6/1991 | Mccutchen | G06T 3/08 348/383 |
| 5,185,667 A * | 2/1993 | Zimmermann | H04N 23/698 348/E7.087 |
| 5,592,599 A * | 1/1997 | Lindholm | G06T 15/10 348/E5.051 |
| 9,936,238 B2 * | 4/2018 | Grubbs | H04N 21/2541 |
| 10,244,200 B2 * | 3/2019 | Wozniak | H04N 19/597 |
| 10,740,957 B1 * | 8/2020 | McElroy | A63F 13/355 |
| 2016/0360104 A1 * | 12/2016 | Zhang | H04N 23/698 |
| 2017/0354883 A1 * | 12/2017 | Benedetto | A63F 13/5258 |
| 2018/0075652 A1 * | 3/2018 | Kim | G06T 17/00 |
| 2018/0093186 A1 * | 4/2018 | Black | G06T 11/60 |
| 2018/0130243 A1 * | 5/2018 | Kim | G06T 3/4038 |
| 2019/0082144 A1 | 3/2019 | Hakata et al. | |

(Continued)

FOREIGN PATENT DOCUMENTS

| JP | 2012-178135 | 9/2012 |
|---|---|---|
| JP | 2019-192229 | 10/2019 |

*Primary Examiner* — Justin W Rider
(74) *Attorney, Agent, or Firm* — XSENSUS LLP

(57) ABSTRACT

A display terminal is configured to display a predetermined area image of a predetermined area in a wide visual field image. The display terminal includes circuitry; and a memory storing computer-executable instructions that cause the circuitry to execute displaying, on a display, a first predetermined area image of a first predetermined area in the wide visual field image, and the wide visual field image. The displaying includes displaying a display area corresponding to the first predetermined area on the wide visual field image displayed on the display.

20 Claims, 39 Drawing Sheets

(56) References Cited

U.S. PATENT DOCUMENTS

| | | |
|---|---|---|
| 2019/0098211 A1 | 3/2019 | Ohmura et al. |
| 2019/0098253 A1 | 3/2019 | Soneda et al. |
| 2019/0208142 A1* | 7/2019 | Kitaya .................. H04N 23/63 |
| 2019/0306004 A1 | 10/2019 | Hakata et al. |
| 2019/0306201 A1 | 10/2019 | Ohmura et al. |
| 2019/0324963 A1 | 10/2019 | Mano |
| 2020/0128902 A1* | 4/2020 | Brown ..................... A42B 3/30 |
| 2020/0240206 A1* | 7/2020 | Hebeisen .................. E06B 9/68 |
| 2020/0296284 A1* | 9/2020 | Aikawa ................ H04N 23/661 |
| 2022/0230275 A1* | 7/2022 | Hohjoh ................ H04N 23/698 |
| 2023/0269482 A1* | 8/2023 | Homma .................... G06F 3/14 |
| | | 348/36 |
| 2023/0308622 A1* | 9/2023 | Sawada ................. H04N 23/90 |

* cited by examiner

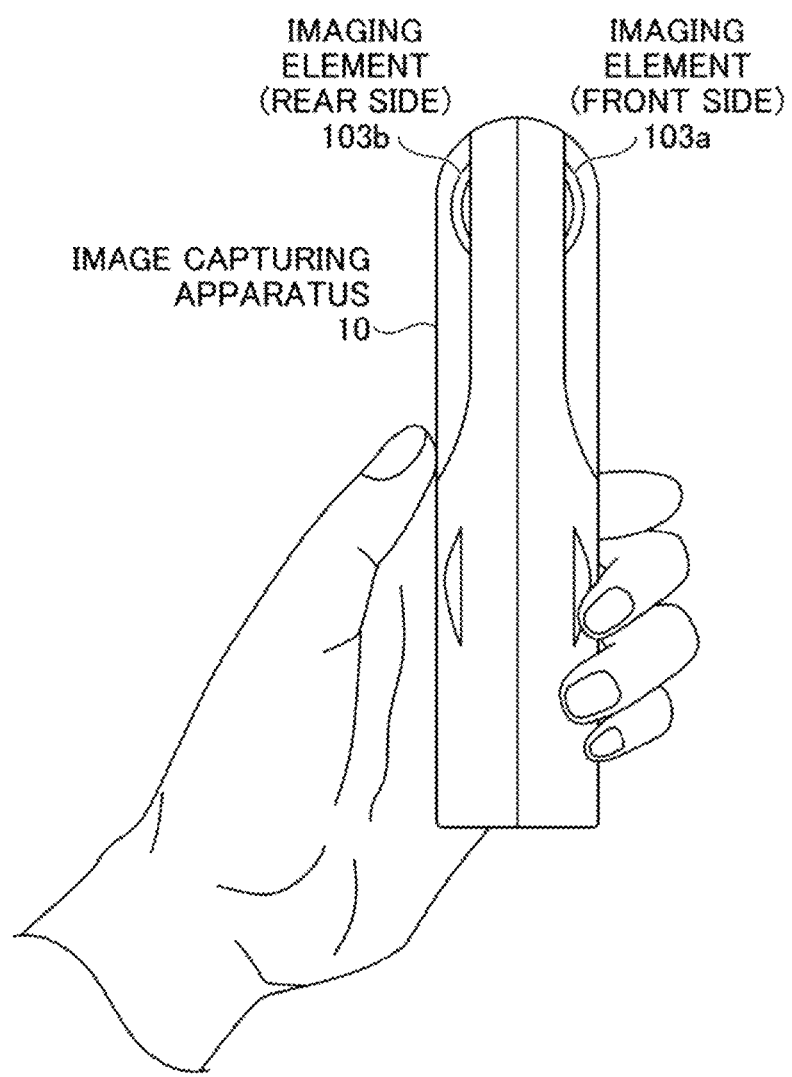

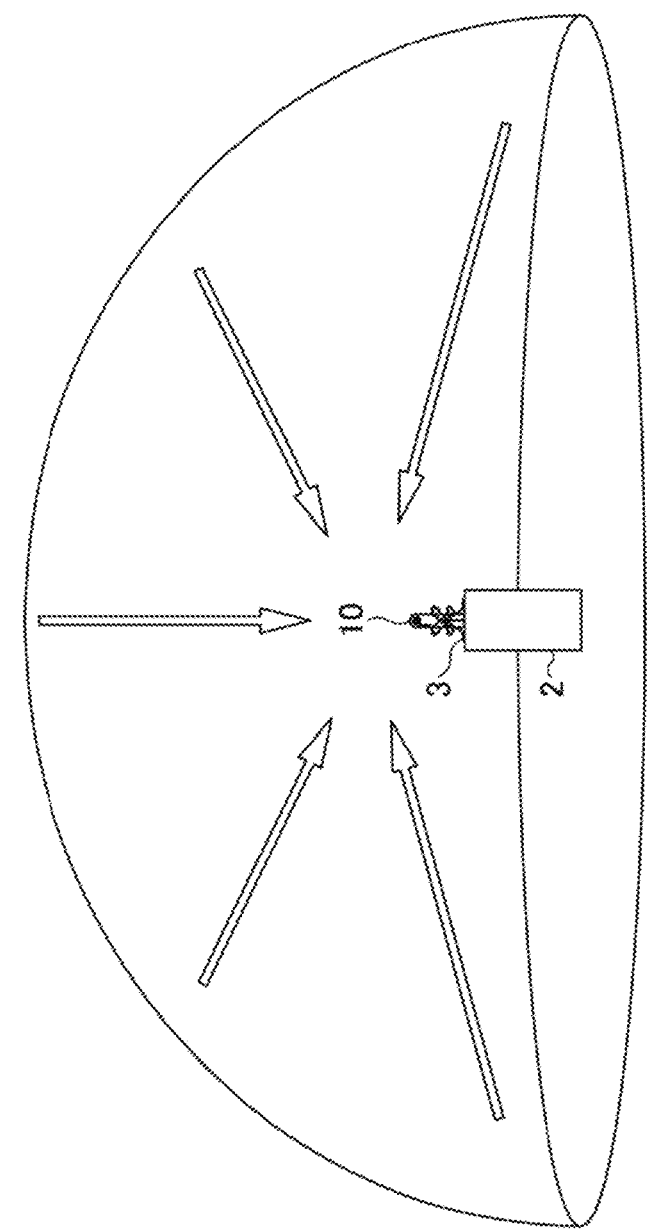

HEMISPHERICAL IMAGE
(FRONT)

HEMISPHERICAL IMAGE
(BACK)

CAPTURED IMAGE

FIG.4A
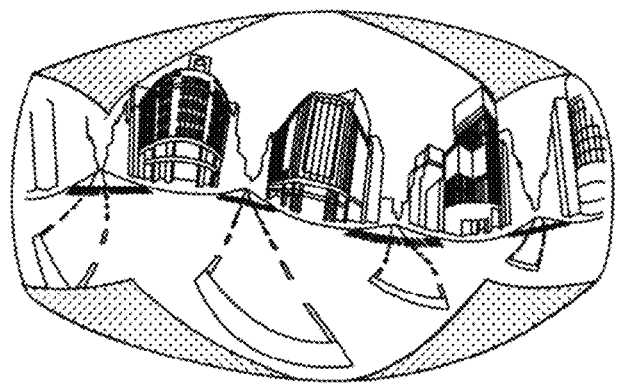
EQUIRECTANGULAR PROJECTION IMAGE EC
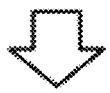
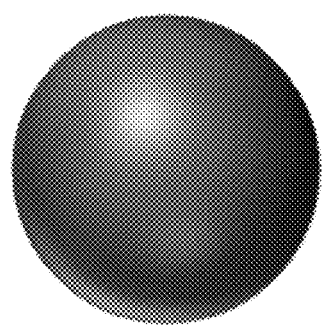
FIG.4B
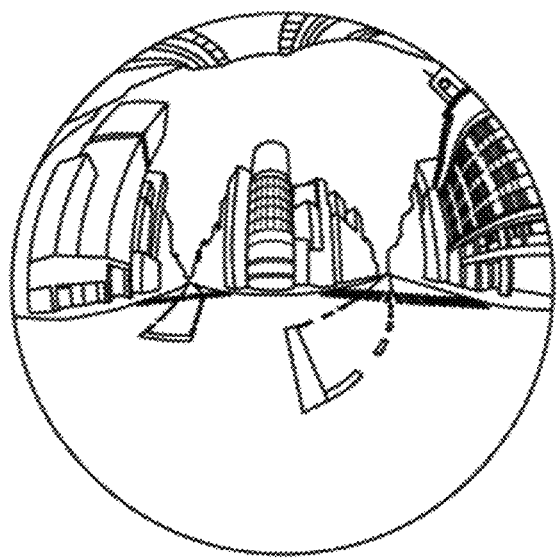
FULLY SPHERICAL IMAGE CE

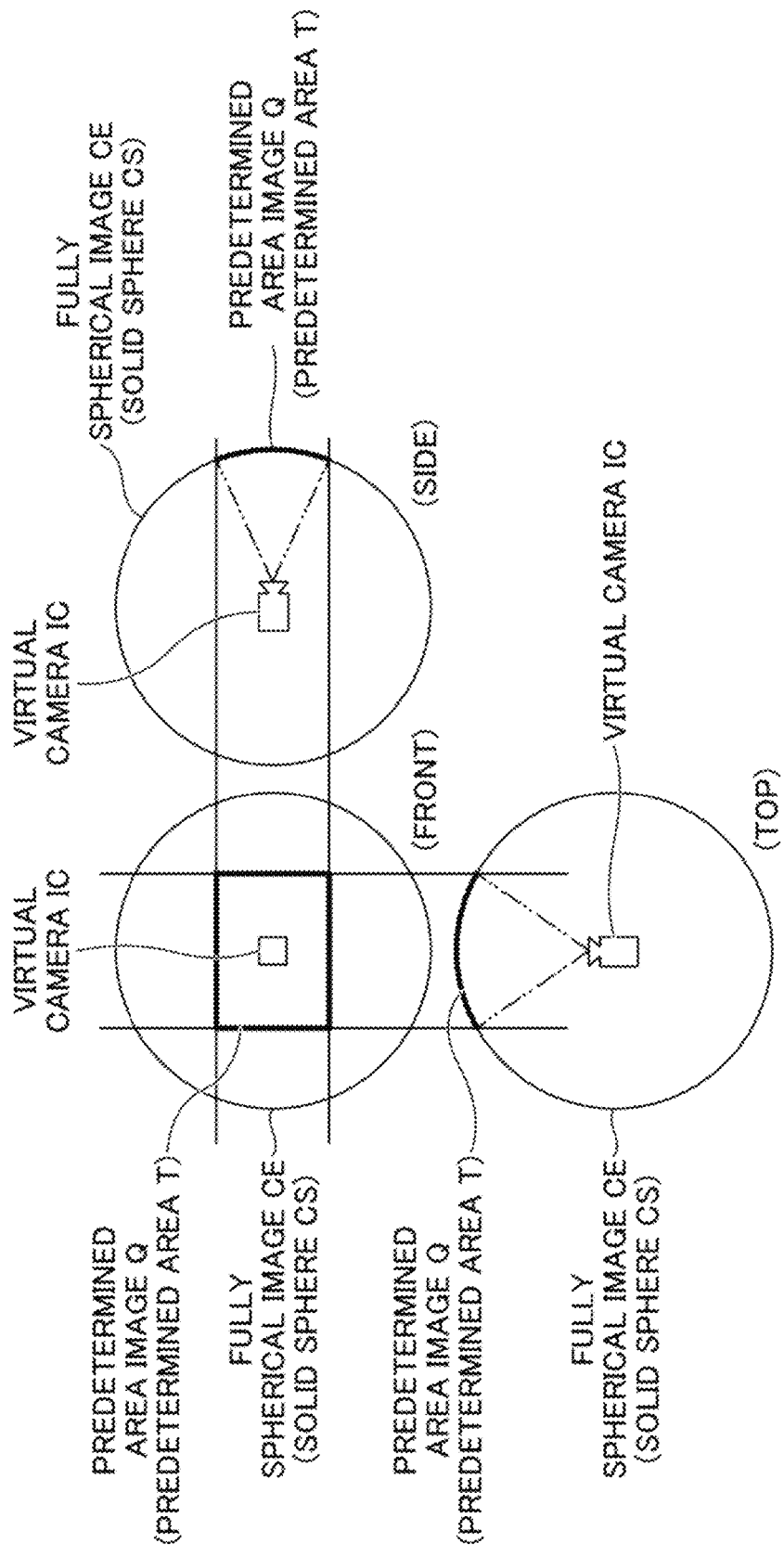

FIG.14
| DEVICE ID/USER ID | PASSWORD | NAME | USER IMAGE | IP ADDRESS |
|---|---|---|---|---|
| 111d | pw111d | IMAGE CAPTURING APPARATUS α | | 1.1.1.1. |
| 112d | pw112d | IMAGE CAPTURING APPARATUS β | | 1.2.1.1. |
| 100x | pw100x | ORGANIZER X | 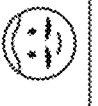 | 1.1.1.2. |
| 100a | pw100a | PARTICIPANT A |  | 1.1.2.1. |
| 100b | pw100b | PARTICIPANT B | 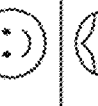 | 1.1.2.2. |
| 100c | pw100c | PARTICIPANT C |  | 1.1.2.3. |
| ... | ... | ... | ... | ... |

FIG.15

| VIRTUAL ROOM ID | VIRTUAL ROOM NAME | DEVICE ID | ORGANIZER ID | PARTICIPANT ID | CONTENT ID | CONTENT URL | ANGLE OF VIEW INFORMATION URL |
|---|---|---|---|---|---|---|---|
| 111r | CONSTRUCTION SITE α | 101d | 100x | 100a, 100b | C101 | ... | ... |
| 112r | FACTORY η | 102d | 100y | 100e, 100f | C102 | ... | ... |
| ... | ... | ... | ... | ... | ... | ... | ... |

FIG.16

| CONTENT ID: C111 | | ANGLE OF VIEW INFORMATION | | | TIME STAMP (RECORDING ELAPSED TIME/ PLAYBACK ELAPSED TIME) |
|---|---|---|---|---|---|
| USER ID | IP ADDRESS | pan ($\phi$) | tilt ($\theta$) | fov ($\alpha$) | |
| 100a | 1.2.3.1 | 20 | 30 | 60 | 2022/10/31 15:00:00.00 |
| 100b | 1.2.3.2 | 30 | 40 | 55 | 2022/10/31 15:00:00.00 |
| 100x | 1.2.3.4 | 65 | 50 | 25 | 2022/10/31 15:00:00.00 |
| ... | ... | ... | ... | ... | ... |

DISPLAY TERMINAL, COMMUNICATION SYSTEM, DISPLAY METHOD, AND RECORDING MEDIUM WHICH DISPLAYS AN IMAGE OF PREDETERMINED AREA IN A WIDE VISUAL FIELD IMAGE AND THE WIDE VISUAL FIELD IMAGE

CROSS-REFERENCE TO RELATED APPLICATIONS

The present application is based on and claims priority under 35 U.S.C. § 119 to Japanese Patent Application No. 2023-046364, filed on Mar. 23, 2023 and Japanese Patent Application No. 2023-219746, filed on Dec. 26, 2023, the contents of which are incorporated herein by reference in their entirety.

BACKGROUND OF THE INVENTION

1. Field of the Invention

The present disclosure relates to a display terminal, a communication system, a display method, and a recording medium.

2. Description of the Related Art

In recent years, an image of a wide visual field (hereinafter referred to as a "wide visual field image") having a wide visual field angle, such as a 360 degree image (also referred to as a fully spherical image, an omnidirectional image, or an entire circumference image) in which the entire circumference of 360 degrees is imaged, has been known as an imaging range including parts that cannot be confirmed by a regular visual field angle. When the entirety of such a wide visual field image is to be displayed by a display terminal, the wide visual field image is curved and difficult to view, and because of this, each user displays and views a predetermined area image illustrating a desired predetermined area in the same wide visual field image.

Further, by connecting an observer with a remote viewer by using a fully spherical image capturing apparatus and a live streaming system, a service for the viewer to view the fully spherical image distributed by live streaming is provided. Live streaming is a method for streaming a video over the Internet or the like. In this case, the communication terminal of the observer displays, with respect to a predetermined area image displayed by the observer, points of interest and display direction marks for indicating where each viewer is viewing based on the predetermined area image (see Patent Document 1).

Patent Document 1: Japanese Unexamined Patent Application Publication No. 2019-192229

SUMMARY OF THE INVENTION

According to one aspect of the present invention, there is provided a display terminal configured to display a predetermined area image of a predetermined area in a wide visual field image, the display terminal including circuitry; and a memory storing computer-executable instructions that cause the circuitry to execute: displaying, on a display, a first predetermined area image of a first predetermined area in the wide visual field image, and the wide visual field image, wherein the displaying includes displaying a display area corresponding to the first predetermined area on the wide visual field image displayed on the display.

BRIEF DESCRIPTION OF THE DRAWINGS

FIG. 1A is a left side view of the image capturing apparatus.

FIG. 2 is a usage image diagram of the image capturing apparatus according to an embodiment of the present invention;

FIG. 4A illustrates a conceptual diagram illustrating a state of covering a sphere with the Mercator image, and FIG. 4B illustrates a fully spherical image according to an embodiment of the present invention;

FIG. 5 illustrates the position of a virtual camera and a predetermined area when the fully spherical image is a three-dimensional solid sphere according to an embodiment of the present invention;

FIG. 14 is a conceptual diagram of a user/device management database according to the first embodiment of the present invention;

FIG. 15 is a conceptual diagram of a virtual room management database according to the first embodiment of the present invention;

FIG. 16 is a conceptual diagram of an angle of view information management database according to the first embodiment of the present invention;

DESCRIPTION OF THE EMBODIMENTS

In the conventional method, it is possible to identify where each viewer is viewing based on a predetermined area image displayed on the communication terminal of the observer, but it is difficult to identify where each viewer is viewing in the entire wide visual field image such as a fully spherical image.

A problem to be addressed by an embodiment of the present invention is to facilitate the identification of where each of the users including oneself is viewing in a wide visual field image.

Embodiments of the present invention will now be described with reference to the drawings.

[Overview of Fully Spherical Image]

A method for generating a fully spherical image will be described with reference to FIGS. 1A to 8. The fully spherical image, also referred to as a fully spherical panoramic image or a 360° panoramic image, is an example of a wide visual field moving image having a visual field angle of a wide range. The wide visual field image includes a simple panoramic image of approximately 180°.

Figure 1B:
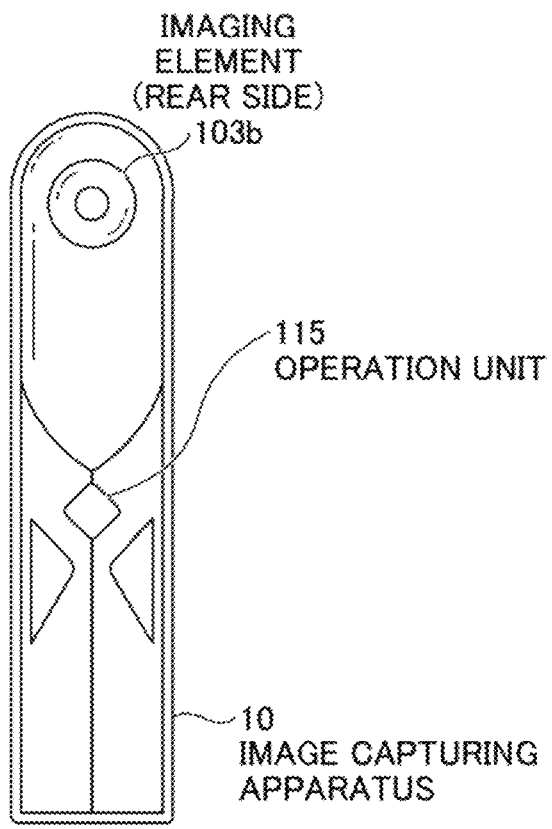
FIG. 1B is a front view of the image capturing apparatus.
Figure 1C:
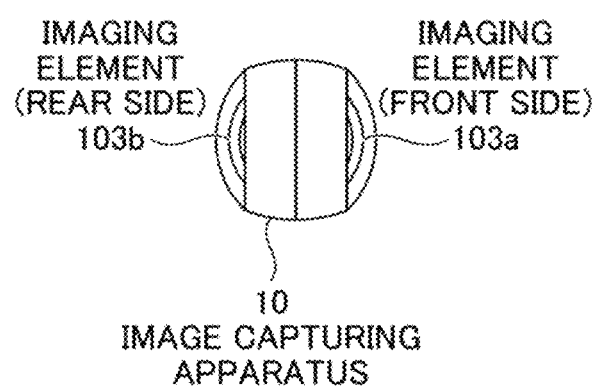
FIG. 1C is a top view of the image capturing apparatus according to an embodiment of the present invention.

First, the appearance of an image capturing apparatus 10 will be described with reference to FIGS. 1A to 1C. The image capturing apparatus 10 is a digital camera for capturing an image as a source of a fully spherical image. FIG. 1A is a left side view of the image capturing apparatus, FIG. 1B is a front view of the image capturing apparatus, and FIG. 1C is a planar view of the image capturing apparatus.

As illustrated in FIG. 1A, the image capturing apparatus 10 has a size that can be held by a person in one hand. Further, as illustrated in FIGS. 1A, 1B, and 1C, on the upper part of the image capturing apparatus 10, an imaging element 103a is provided on the front side and an imaging element 103b is provided on the rear side. Further, as illustrated in FIG. 1B, an operation unit 115 such as a shutter button is provided on the front side of the image capturing apparatus 10.

Next, the usage state of the image capturing apparatus 10 will be described with reference to FIG. 2. FIG. 2 is an image diagram of the usage of the image capturing apparatus. As illustrated in FIG. 2, the image capturing apparatus 10 is communicatively connected to a relay apparatus 3 installed on some kind of platform 2, and is used for capturing surrounding objects, scenery, etc. In this case, two hemispherical images can be obtained by capturing the objects around the user by the imaging elements 103a and 103b illustrated in FIG. 1, respectively. If the image capturing apparatus 10 does not transmit fully spherical images obtained by capturing images, to other communication terminals or systems, the relay apparatus 3 is unnecessary.

Figure 3A:
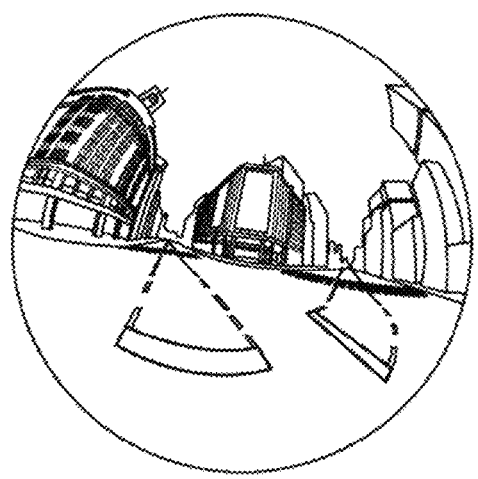
FIG. 3A illustrates a hemispherical image (front) captured by the image capturing apparatus.
Figure 3B:
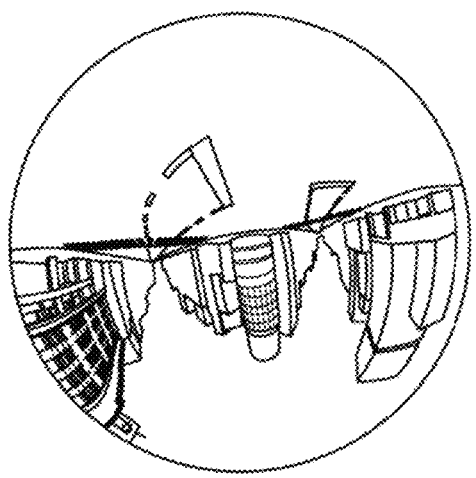
FIG. 3B illustrates another hemispherical image (back) captured by the image capturing apparatus.
Figure 3C:
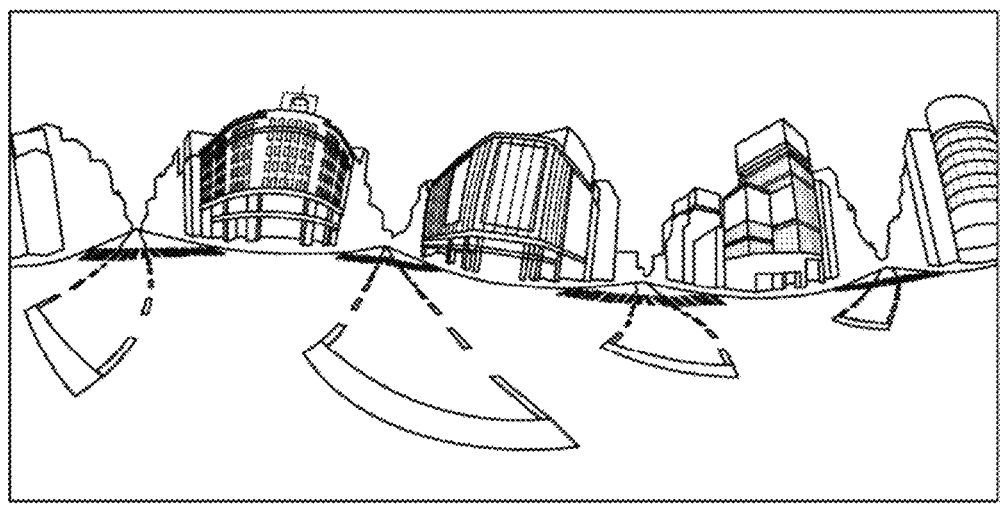
FIG. 3C illustrates an image represented by the Mercator projection according to an embodiment of the present invention.

Next, with reference to FIGS. 3A to 4B, an outline of the processing until the fully spherical image is created from the image captured by the image capturing apparatus 10 will be described. FIG. 3A is a hemispherical image (front side) captured by the image capturing apparatus, FIG. 3B is a hemispherical image (rear side) captured by the image capturing apparatus, and FIG. 3C is a view illustrating an image represented by equirectangular projection (hereinafter referred to as a "equirectangular projection image"). An image represented by Mercator projection or the like (hereinafter referred to as a "Mercator image") may also be used. FIG. 4A is a conceptual diagram illustrating a state of covering a sphere with a equirectangular projection image, and FIG. 4B is a diagram illustrating a fully spherical image. The equirectangular projection image is a fully spherical image in the equirectangular format as an example of the wide visual field image described above.

As illustrated in FIG. 3A, an image obtained by the imaging element 103a is a hemispherical image (front side) curved by a wide-angle lens 102a such as the fisheye lens described later. As illustrated in FIG. 3B, an image obtained by the imaging element 103b is a hemispherical image (rear side) curved by a wide-angle lens 102b such as the fisheye lens described later. Then, the image capturing apparatus 10 combines the hemispherical image (front side) and the hemispherical image (rear side) inverted by 180 degrees to produce a equirectangular projection image EC as illustrated in FIG. 3C.

Then, the image capturing apparatus 10 uses software such as Open GL ES (Open Graphics Library for Embedded Systems) to paste the equirectangular projection image EC so as to cover the spherical surface as illustrated in FIG. 4A, and produces a fully spherical image CE as illustrated in FIG. 4B. Thus, the fully spherical image CE is represented as an image in which the equirectangular projection image EC faces the center of the sphere. Open GL ES is a graphics library used to visualize 2D (2-Dimensions) and 3D (3-Dimensions) data. Open GL ES is an example of software that performs image processing, and other software may be used to create a fully spherical image CE. The fully spherical image CE may be a still image or a moving image. Although the image capturing apparatus 10 has been described here as an example for generating a fully spherical image, a communication control system 5 or communication terminals 7 and 9 (to be described later) may execute the same image processing or a part of the image processing.

By using Open GL ES (Open Graphics Library for Embedded Systems), the Mercator image is pasted to cover the spherical surface as illustrated in FIG. 4A, and a fully spherical image as illustrated in FIG. 4B is created. Thus, the fully spherical image is represented as an image in which the Mercator image is facing the center of the sphere. Open GL ES is a graphics library used to visualize 2D (2-Dimensions) and 3D (3-Dimensions) data.

As described above, the fully spherical image CE is an image pasted to cover a spherical surface, which appears peculiar when viewed by people. Therefore, the communication terminals 7 and 9 display a predetermined area (hereinafter referred to as "predetermined area image"), which is a part of the fully spherical image, as a planar image with little curvature (distortion), so that the image can be displayed without appearing peculiar to people. This will be described with reference to FIGS. 5 to 8.

Figure 6A:
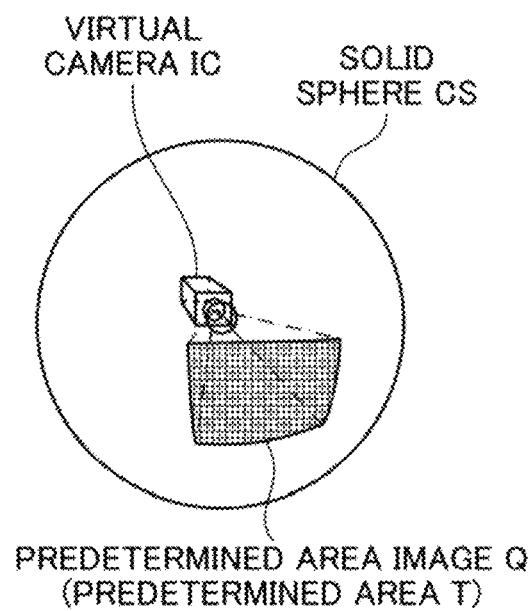
FIG. 6A is a stereoscopic perspective view of FIG. 5.
Figure 6B:
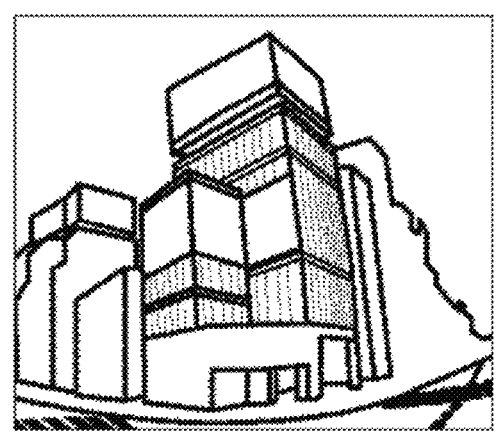
FIG. 6B is a view in which a predetermined area image in the state of FIG. 6A is displayed on a display.

FIG. 5 is a diagram illustrating the position of a virtual camera and a predetermined area when the fully spherical image is a three-dimensional solid sphere. A virtual camera IC corresponds to the position of a virtual viewpoint of a user viewing the image with respect to the fully spherical image CE displayed as a three-dimensional solid sphere. FIG. 6A is a stereoscopic perspective view of FIG. 5, FIG. 6B is a view in which a predetermined area image in the state of FIG. 6A is displayed on a display, FIG. 6C is a view illustrating a predetermined area after changing the viewpoint of the virtual camera IC in FIG. 6A, and FIG. 6D is a view in which a predetermined area image in the state of FIG. 6C is displayed on a display.

If the fully spherical image CE thus generated is a solid sphere CS, as illustrated in FIG. 5, the virtual camera IC is located inside the fully spherical image CE. A predetermined area T in the fully spherical image CE is an imaging area of the virtual camera IC and is specified by angle of view information (also referred to as "area information") indicating the imaging direction and angle of view of the virtual camera IC in a three-dimensional virtual space including the fully spherical image CE.

The zoom of the predetermined area T can also be expressed by moving the virtual camera IC closer to or farther away from the fully spherical image CE. A predetermined area image Q is an image of the predetermined area T in the fully spherical image CE. Therefore, the predetermined area T can be specified by an angle of view α and a distance f from the virtual camera IC to the fully spherical image CE (to be described later).

Figure 6C:
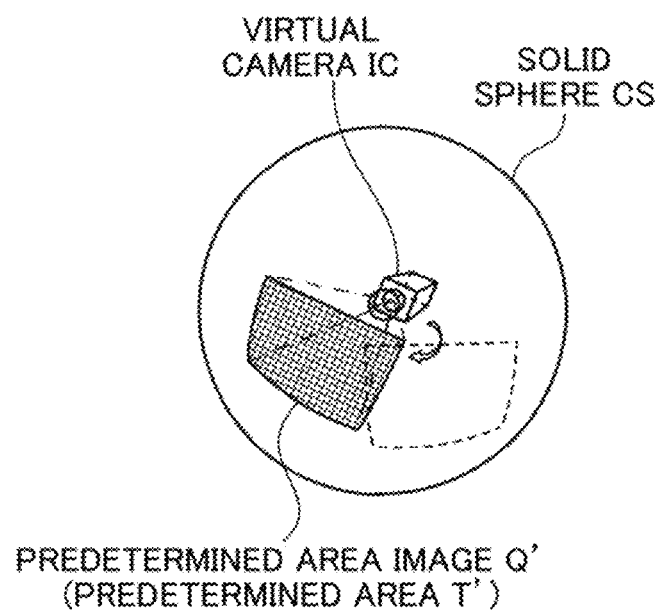
FIG. 6C is a view illustrating a predetermined area after changing the viewpoint of the virtual camera IC in FIG. 6A.
Figure 6D:
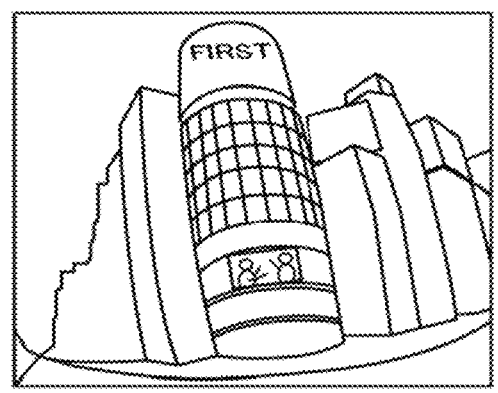
FIG. 6D is a view in which a predetermined area image in the state of FIG. 6C is displayed on a display according to an embodiment of the present invention.

When the virtual viewpoint of the virtual camera IC is moved (also referred to as "change") from the state of FIG. 6A, to the right side (left side as viewed in the drawing) as illustrated in FIG. 6C, the predetermined area T in the fully spherical image CE is moved to the predetermined area T' accordingly, so that the predetermined area image Q displayed on the predetermined display is changed to the predetermined area image Q'. As a result, the image illustrated in FIG. 6B is changed to and displayed as the image illustrated in FIG. 6D on the predetermined display.

Figure 7:
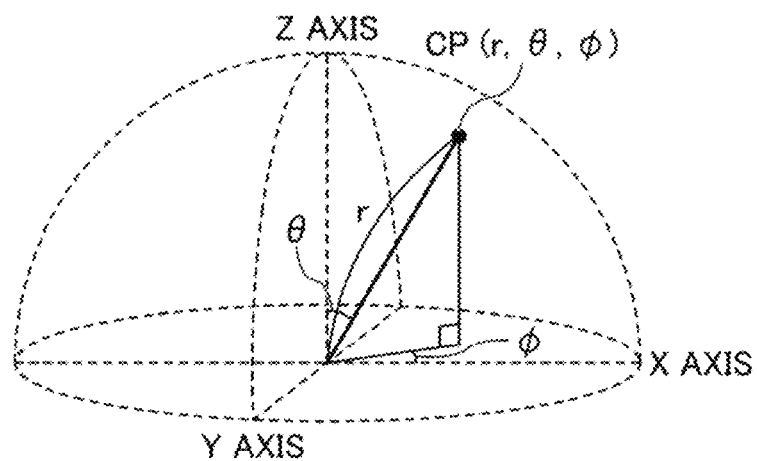
FIG. 7 is a view illustrating a point in three-dimensional Euclidean space in spherical coordinates according to an embodiment of the present invention.
Figure 8:
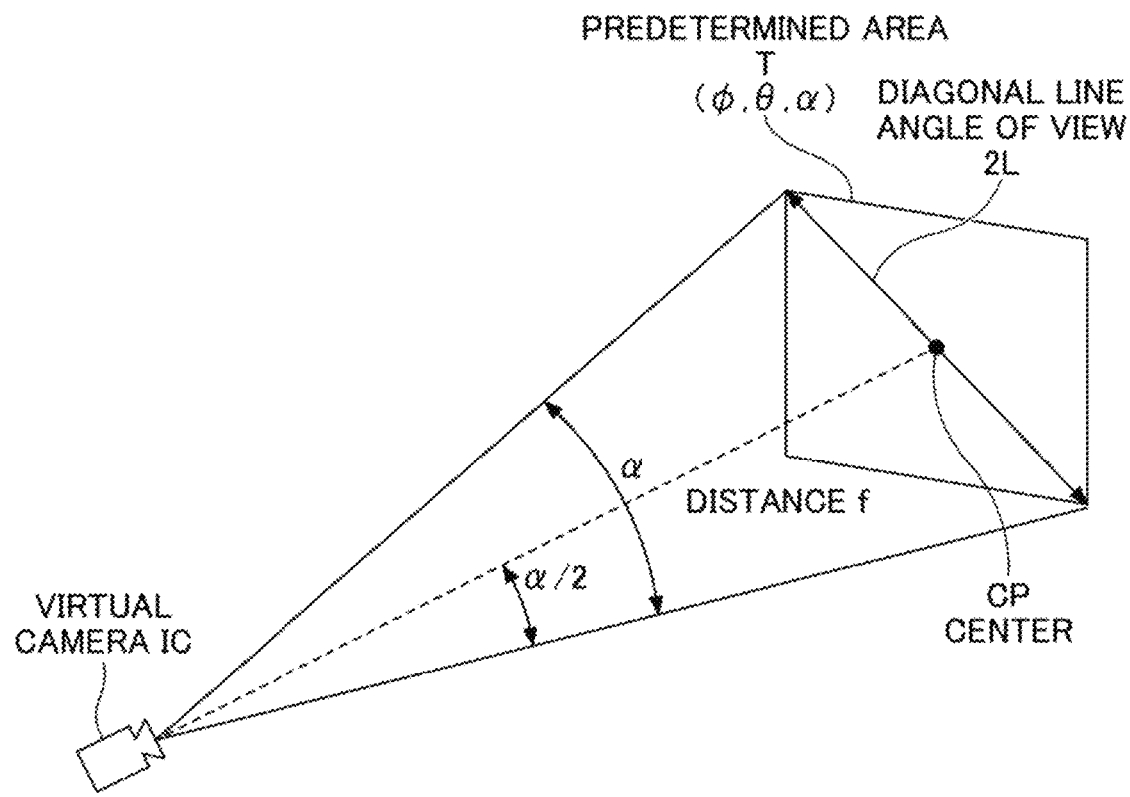
FIG. 8 is a conceptual diagram illustrating the relationship between a predetermined area and a point of interest according to an embodiment of the present invention.

Next, the relationship between the angle of view information and the image of the predetermined area T will be described with reference to FIGS. 7 and 8. FIG. 7 is a diagram illustrating a point in a three-dimensional Euclidean space according to spherical coordinates. FIG. 8 is a conceptual diagram illustrating a relationship between a predetermined area and a point of interest (center point).

Here, when a center cp illustrated in FIG. 7 is expressed in a spherical polar coordinate system, arbitrary position coordinates are set as (r, θ, φ). The position coordinates (r, θ, φ) are the moving radius, the polar angle, and the azimuthal angle, respectively. The moving radius r is the distance from the origin of the three-dimensional virtual space including the fully spherical image to an arbitrary point (the center cp in FIG. 8) and is equal to the distance f illustrated in FIG. 8.

Further, as illustrated in FIG. 8, when the center of the predetermined area T, which is the imaging area of the virtual camera IC, is considered as the center cp in FIG. 7, the trigonometric function indicated in (Formula 1) below is generally satisfied.

$$(L/f) = \tan(\alpha/2) \qquad \text{(Formula 1)}$$

Note that the notation f is the distance from the virtual camera IC to the center cp. The notation L is the distance between any vertex of the predetermined area T and the center cp (2L is a diagonal line). The notation α is the angle of view. In this case, the angle of view information for identifying the predetermined area T can be represented by pan (φ), tilt (θ), and fov (α). The zoom of the predetermined area T can be represented by expanding or contracting the range (arc) of the angle of view α.

First Embodiment

[Outline of the First Communication System]

Figure 9:
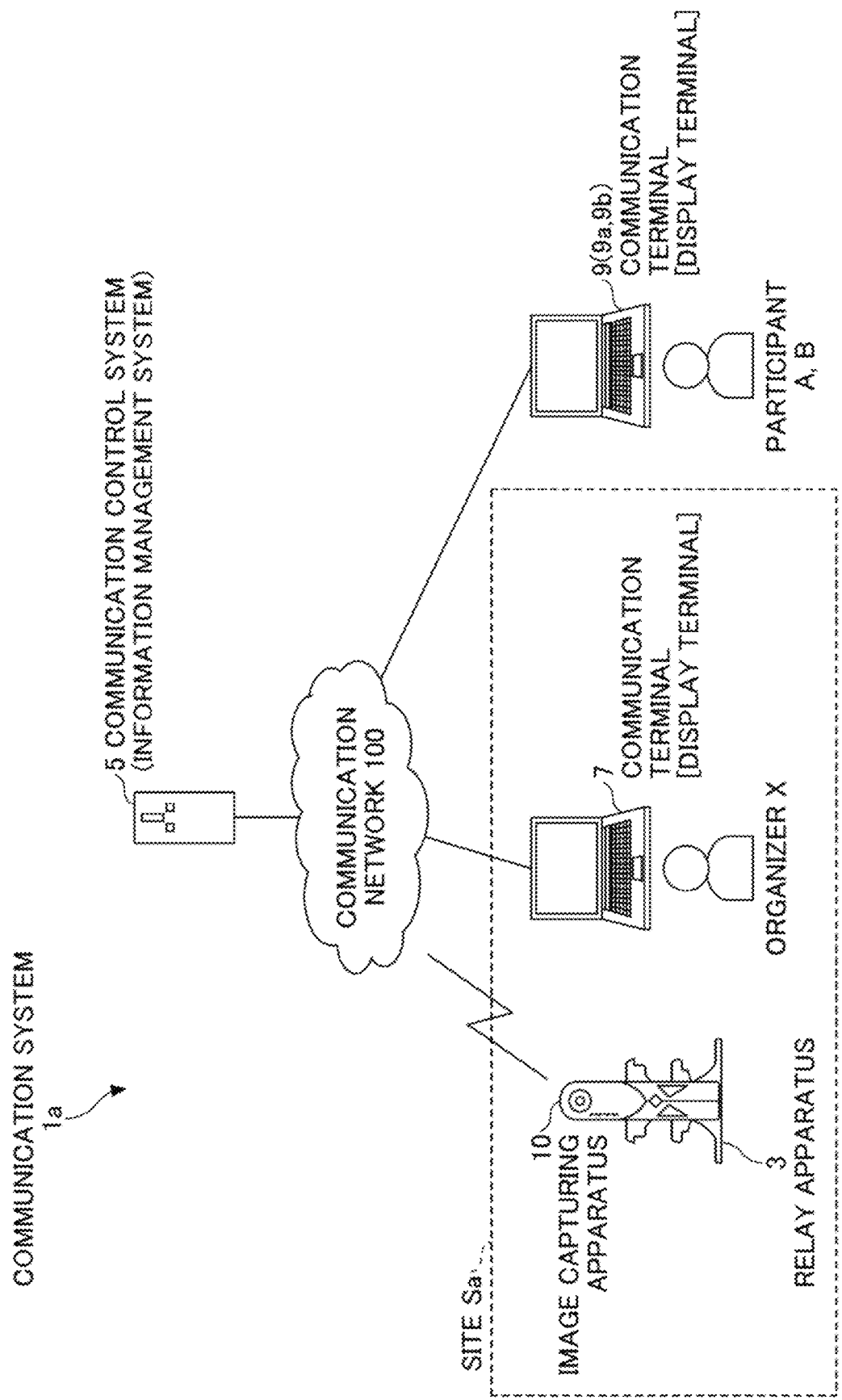
FIG. 9 is a schematic diagram of a communication system according to a first embodiment of the present invention.

Next, an outline of a communication system 1a according to the first embodiment will be described with reference to FIG. 9. FIG. 9 is a schematic diagram of a communication system according to the first embodiment.

As illustrated in FIG. 9, a communication system 1a according to the present embodiment includes the image capturing apparatus 10, the relay apparatus 3, the communication terminal 7, and the communication terminals 9a and 9b. The communication terminals 9a and 9b are collectively referred to as the "communication terminal 9". The communication terminals may be referred to as "display terminals" for displaying images, etc.

Among these, the image capturing apparatus 10 is a digital camera for obtaining a wide visual field image (a fully spherical image, etc.), as described above. The relay apparatus 3 has a function of a cradle for charging the image capturing apparatus 10 and transmitting/receiving data. The relay apparatus 3 can perform data communication with the image capturing apparatus 10 via a contact point and can perform data communication with the communication control system 5 via a communication network 100. The communication network 100 includes, for example, the Internet, a Local Area Network (LAN), a (wireless) router, and the like.

The communication control system 5 is, for example, a computer and can perform data communication with the relay apparatus 3 and communication terminals 7 and 9 via the communication network 100. The communication control system 5 can also be referred to as an "information management system" for managing the angle of view information, etc.

The communication terminals 7 and 9 are computers such as a notebook PC (Personal Computer), for example, and can perform data communication with the communication control system 5 via the communication network 100. Open GL ES is installed in the communication terminals 7 and 9, and a predetermined area image (see FIGS. 6A to 6D) is created from the fully spherical image received from the communication control system 5. The communication control system 5 may be configured by a single computer or a plurality of server computers.

Further, the image capturing apparatus 10 and the relay apparatus 3 are installed at a predetermined position by an organizer X or the like at a site Sa such as a construction site, an exhibition site, an educational site, a medical site, or the like. The communication terminal 7 is operated by the organizer X. The communication terminal 9a is operated by a participant A such as a viewer in a remote area with respect to the local area Sa. Similarly, the communication terminal 9b is operated by a participant B such as a viewer in a remote area with respect to the local area Sa. The participant A and the participant B may be in the same place or different places.

The communication control system 5 transmits (distributes) the wide visual field image obtained from the image capturing apparatus 10 through the relay apparatus 3, to the communication terminals 7 and 9. The communication control system 5 receives, from the communication terminals 7 and 9, the respective pieces of angle of view information for identifying the predetermined area of the predetermined area image being displayed by the communication terminals 7 and 9, and transmits the respective pieces of angle of view information to the communication terminals 7 and 9. The wide visual field image may be a moving image (wide visual field moving image) or a still image (wide visual field still image).

[Hardware Configuration of the First Embodiment]

Next, the hardware configuration of the image capturing apparatus 10, the relay apparatus 3, and the communication terminals 7 and 9 of the present embodiment will be described in detail with reference to FIGS. 10 to 12.

<Hardware Configuration of Image Capturing Apparatus>

Figure 10:
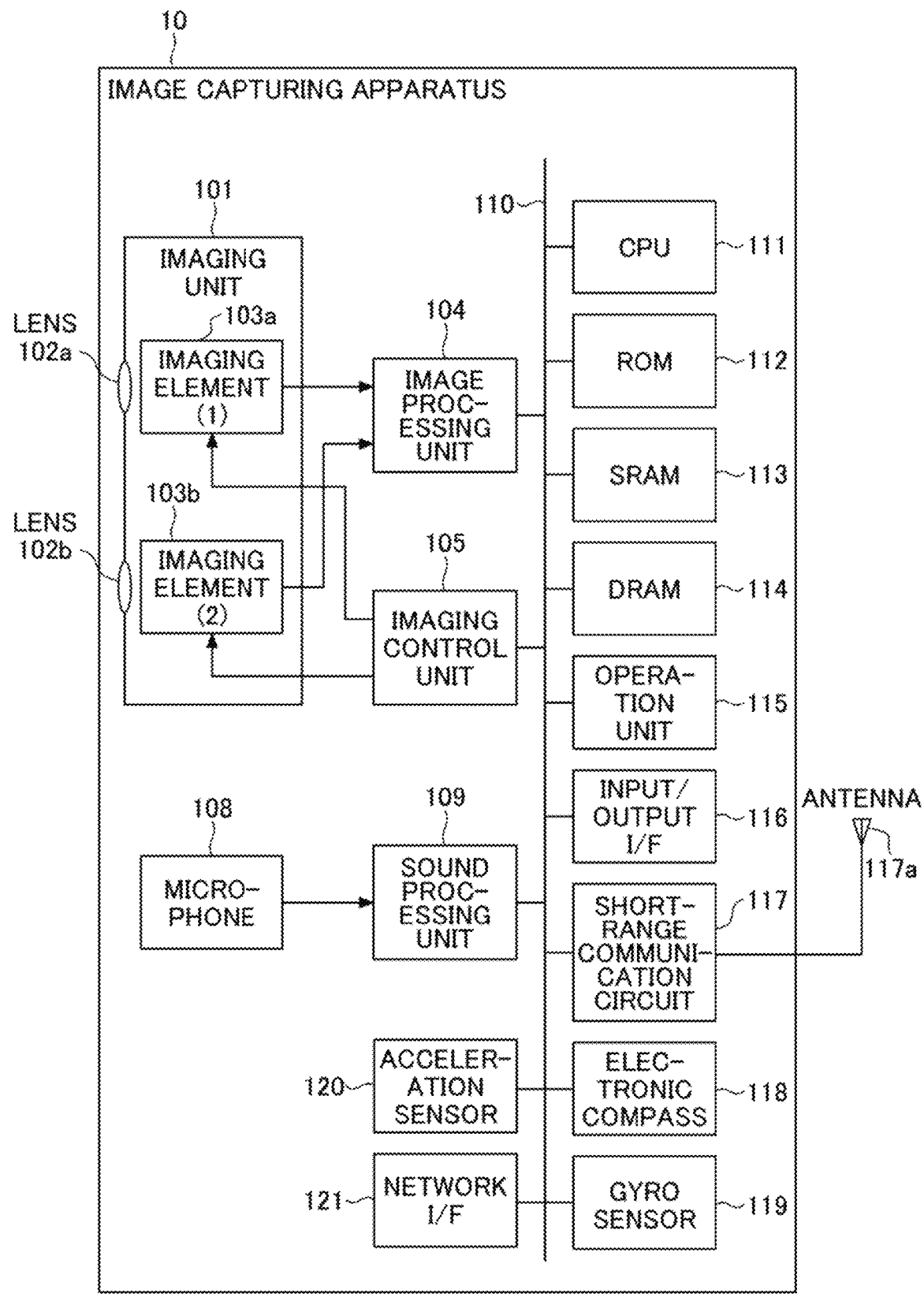
FIG. 10 is a hardware configuration diagram of an image capturing apparatus according to the first embodiment of the present invention.

FIG. 10 illustrates a hardware configuration diagram of the image capturing apparatus 10. As illustrated in FIG. 10, the image capturing apparatus 10 includes an imaging unit 101, an image processing unit 104, the imaging control unit 105, a microphone 108, a sound processing unit 109, a Central Processing Unit (CPU) 111, a Read Only Memory (ROM) 112, a Static Random Access Memory (SRAM) 113, a Dynamic Random Access Memory (DRAM) 114, an operation unit 115, an input/output interface (I/F) 116, a short-range communication circuit 117, an antenna 117a of the short-range communication circuit 117, an electronic compass 118, a gyro sensor 119, an acceleration sensor 120, and a network I/F 121.

The imaging unit 101 is provided with wide-angle lenses 102a and 102b (when no distinction is necessary, these are referred to as the lens 102) capable of imaging an angle of view of 180° or more for imaging a hemispherical image, and two imaging elements 103a and 103b provided in association with the lenses 102a and 102b, respectively.

The imaging elements 103a and 103b also include an image sensor such as a Complementary Metal Oxide Semiconductor (CMOS) sensor or a Charge Coupled Device (CCD) sensor that converts an optical image obtained by the lenses 102a and 102b into image data of an electrical signal and outputs the image data, a timing generation circuit that generates a horizontal or vertical synchronization signal of the image sensor, a pixel clock, etc., and a register group in which various commands or parameters necessary for the operation of the imaging element are set. The configuration in which the imaging unit 101 includes two wide-angle lenses is only an example, and may include only one lens or more than three lenses.

The imaging elements 103a and 103b of the imaging unit 101 are connected to the image processing unit 104 via a parallel I/F bus. On the other hand, the imaging elements 103a and 103b of the imaging unit 101 are connected to the imaging control unit 105 via a serial I/F bus (such as an I2C bus).

The image processing unit 104, the imaging control unit 105, and the sound processing unit 109 are connected to the CPU 111 via the bus 110. Further, the ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to a bus 110.

The image processing unit 104 captures the image data output from the imaging elements 103a and 103b through the parallel I/F bus, performs predetermined processing on the respective pieces of image data, and then combines the image data to create the data of a equirectangular projection image (an example of a wide visual field image) to be described later.

The imaging control unit 105 generally uses the imaging control unit 105 as the controller device and the imaging elements 103a and 103b as the responder devices, and uses the I2C bus to set commands and the like in the register groups of the imaging elements 103a and 103b. Necessary commands and the like are received from the CPU 111. The imaging control unit 105 also uses the I2C bus to capture the status data and the like of the register groups of the imaging elements 103a and 103b and sends the status data to the CPU 111.

The imaging control unit 105 also instructs the imaging elements 103a and 103b to output the image data at the timing when the shutter button of the operation unit 115 is pressed. Depending on the image capturing apparatus 10, the imaging control unit 105 may also have a preview display function or a function corresponding to a moving image display using a display (for example, a display of an external terminal such as a smartphone that performs short-range communication with the image capturing apparatus 10 by using the short-range communication circuit 117). In this case, the output of the image data from the imaging elements 103a and 103b is continuously performed at a predetermined frame rate (frames/minute).

The imaging control unit 105 also functions as a synchronization control means for synchronizing the image data output timing of the imaging elements 103a and 103b in cooperation with the CPU 111, as will be described later. In the present embodiment, the image capturing apparatus 10 is not provided with a display unit, but the image capturing apparatus 10 may be provided with a display unit. The microphone 108 converts sound into sound (signal) data. The sound processing unit 109 captures sound data output from the microphone 108 through an I/F bus and performs predetermined processing on the sound data.

The CPU 111 controls the entire operation of the image capturing apparatus 10 and executes necessary processing. The ROM 112 stores various programs for the CPU 111. The SRAM 113 and the DRAM 114 are work memories, and store programs executed by the CPU 111, data during processing, and the like. In particular, the DRAM 114 stores image data during processing by the image processing unit 104 and data of the processed equirectangular projection image.

The operation unit 115 is a generic term for various operation buttons, a power switch, a shutter button, a touch panel having both a display function and an operation function, etc. The user inputs various imaging modes, imaging conditions, and the like by operating the operation unit 115.

The input/output I/F 116 is a generic term for an interface circuit (USB I/F, etc.) with respect to an external medium such as a secure digital (SD) (registered trademark) card or a personal computer, etc. The input/output I/F 116 is wireless or wired. The data of the equirectangular projection image stored in the DRAM 114 is recorded on an external medium via the input/output I/F 116 or transmitted to an external terminal (device) via the input/output I/F 116 as necessary.

The short-range communication circuit 117 communicates with the external terminal (device) by a near-field communication technology such as NFC (Near Field Communication), Bluetooth (registered trademark), or Wi-Fi via the antenna 117a provided in the image capturing apparatus 10. The short-range communication circuit 117 can transmit the data of the equirectangular projection image to the external terminal (device).

The electronic compass 118 calculates the azimuth of the image capturing apparatus 10 from the earth's magnetism and outputs azimuth information. This azimuth information is an example of relevant information (metadata) in line with the Exif, and is used for image processing such as image correction of a captured image. The relevant information also includes data on the imaging date and time of the image and data capacity of the image data.

The gyro sensor 119 is a sensor for detecting an angle change (roll angle, pitch angle, yaw angle) associated with the movement of the image capturing apparatus 10. The angle change is an example of relevant information (metadata) in line with the Exif, and is used for image processing such as image correction of a captured image.

The acceleration sensor 120 is a sensor for detecting the acceleration in the triaxial direction.

The image capturing apparatus 10 calculates the attitude (angle to the gravity direction) of the own device (that is, the image capturing apparatus 10) by using the electronic compass 118, the acceleration sensor 120, and the like. Further, the image capturing apparatus 10 improves the accuracy of image correction by providing the acceleration sensor 120.

The network I/F 121 is an interface for data communication by using the communication network 100 such as the Internet through a router or the like. Further, the hardware configuration of the image capturing apparatus 10 is not limited to the one illustrated here, as long as the functional configuration of the image capturing apparatus 10 can be realized. At least a part of the hardware configuration may be present on the relay apparatus 3 or the communication network 100.

<Hardware Configuration of Relay Apparatus>

Figure 11:
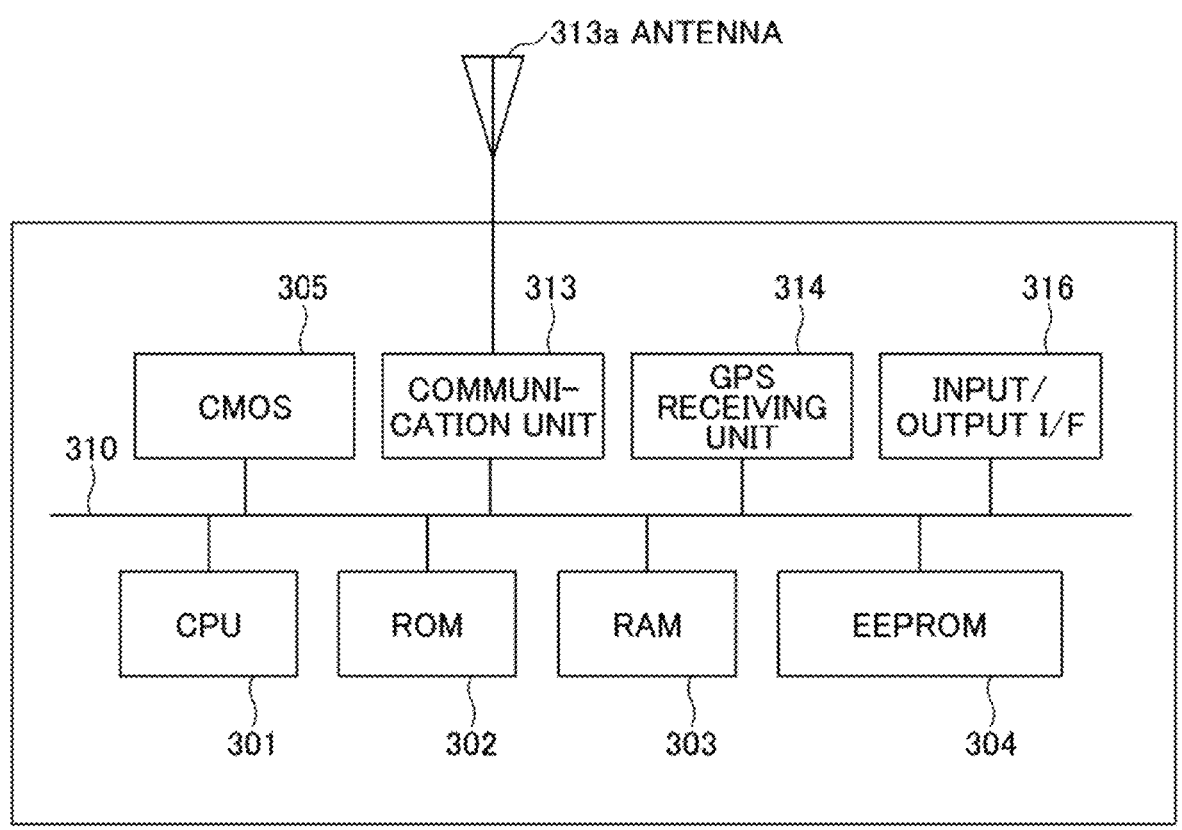
FIG. 11 is a hardware configuration diagram of a relay apparatus according to the first embodiment of the present invention.

FIG. 11 illustrates a hardware configuration diagram of the relay apparatus 3. FIG. 11 is a hardware configuration diagram in the case where the relay apparatus 3 is a cradle having a wireless communication function.

As illustrated in FIG. 11, the relay apparatus 3 includes a CPU 301, a ROM 302, a RAM 303, an EEPROM (Electrically Erasable and Programmable ROM) 304, a CMOS (Complementary Metal Oxide Semiconductor) sensor 305, a bus line 310, a communication unit 313, an antenna 313a, a GPS (global positioning system) receiving unit 314, and an input/output I/F 316.

Among these, the CPU 301 controls the operation of the entire relay apparatus 3. The ROM 302 stores a program used for driving the CPU 301 such as an IPL (Initial Program Loader). The RAM 303 is used as a work area of the CPU 301.

The EEPROM 304 reads or writes data according to the control of the CPU 301. The EEPROM 304 stores an operating system (OS) executed by the CPU 301, other programs, and various kinds of data.

The CMOS sensor 305 is an individual imaging device that captures an object and obtains image data under the control of the CPU 301.

The communication unit 313 communicates with the communication network 100 by a wireless communication signal by using the antenna 313a.

The GPS receiving unit 314 receives a GPS signal including position information (latitude, longitude, and altitude) of the relay apparatus 3 by a GPS (Global Positioning System) satellite or an IMES (Indoor MEssaging System) as an indoor GPS.

The input/output I/F 316 is an interface circuit (such as a USB I/F) electrically connected to the input/output I/F 116 of the image capturing apparatus 10. The input/output I/F 316 is wireless or wired.

The bus line 310 is an address bus or a data bus for electrically connecting each element such as the CPU 301.

<Hardware Configuration of Communication Control System and Communication Terminal>

Figure 12:
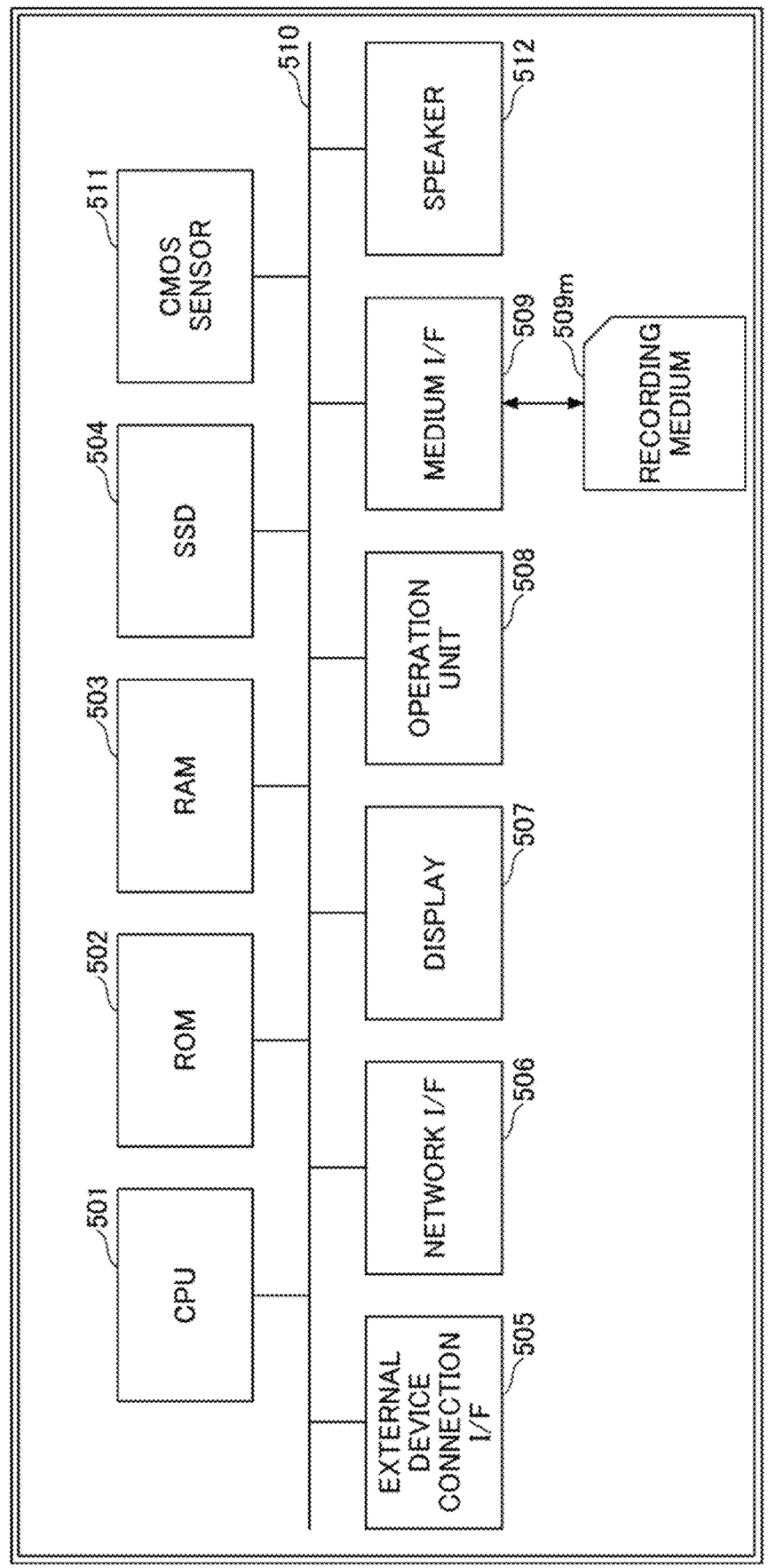
FIG. 12 is a hardware configuration diagram of a communication control system and a communication terminal according to the first embodiment of the present invention.

FIG. 12 illustrates a hardware configuration of the communication control system 5. The hardware configuration of the communication terminals 7 and 9 is the same as that of the communication control system 5, and, therefore, descriptions thereof will be omitted.

As illustrated in FIG. 12, the communication control system 5 includes, as a computer, a CPU 501, a ROM 502, a RAM 503, an SSD 504, an external device connection I/F 505, a network I/F 506, a display 507, an operation unit 508, a medium I/F 509, a bus line 510, a CMOS sensor 511, and a speaker 512.

Among these, the CPU 501 controls the operation of the entire communication control system 5. The ROM 502 stores programs used to drive the CPU 501 such as the IPL. The RAM 503 is used as a work area of the CPU 501.

The SSD 504 reads or writes various kinds of data according to the control of the CPU 501. When the communication terminals 7 and 9 are smartphones or the like, the SSD 504 need not be provided. Instead of the SSD 504, a HDD (Hard Disk Drive) may be provided.

The external device connection I/F 505 is an interface for connecting various external devices. The external devices in this case are a display, a speaker, a keyboard, a mouse, a USB memory, a printer, etc.

The network I/F 506 is an interface for data communication via the communication network 100.

The display 507 is a type of display unit such as a liquid crystal or an organic EL (Electro Luminescence) for displaying various images.

The operation unit 508 is an input unit including various operation buttons, a power switch, a shutter button, a touch panel, etc., for selecting and executing various instructions, selecting a processing object, moving a cursor, etc.

The medium I/F 509 controls reading or writing (storage) of data from or to a recording medium 509m such as a flash memory. The recording medium 509m includes a DVD, a Blu-ray Disc (registered trademark) and the like.

The CMOS sensor 511 is a kind of imaging means for obtaining image data by imaging a subject under the control of the CPU 501. A CCD sensor may be used instead of a CMOS sensor.

The speaker 512 is a circuit that converts electrical signals into physical vibrations to produce sound such as music and speech sounds.

The bus line 510 is an address bus, a data bus, or the like for electrically connecting each element such as the CPU 501.

[Functional Configuration of the First Embodiment]

Next, the functional configuration of the first embodiment will be described with reference to FIGS. 13 to 16.

<Functional Configuration of Image Capturing Apparatus>

Figure 13:
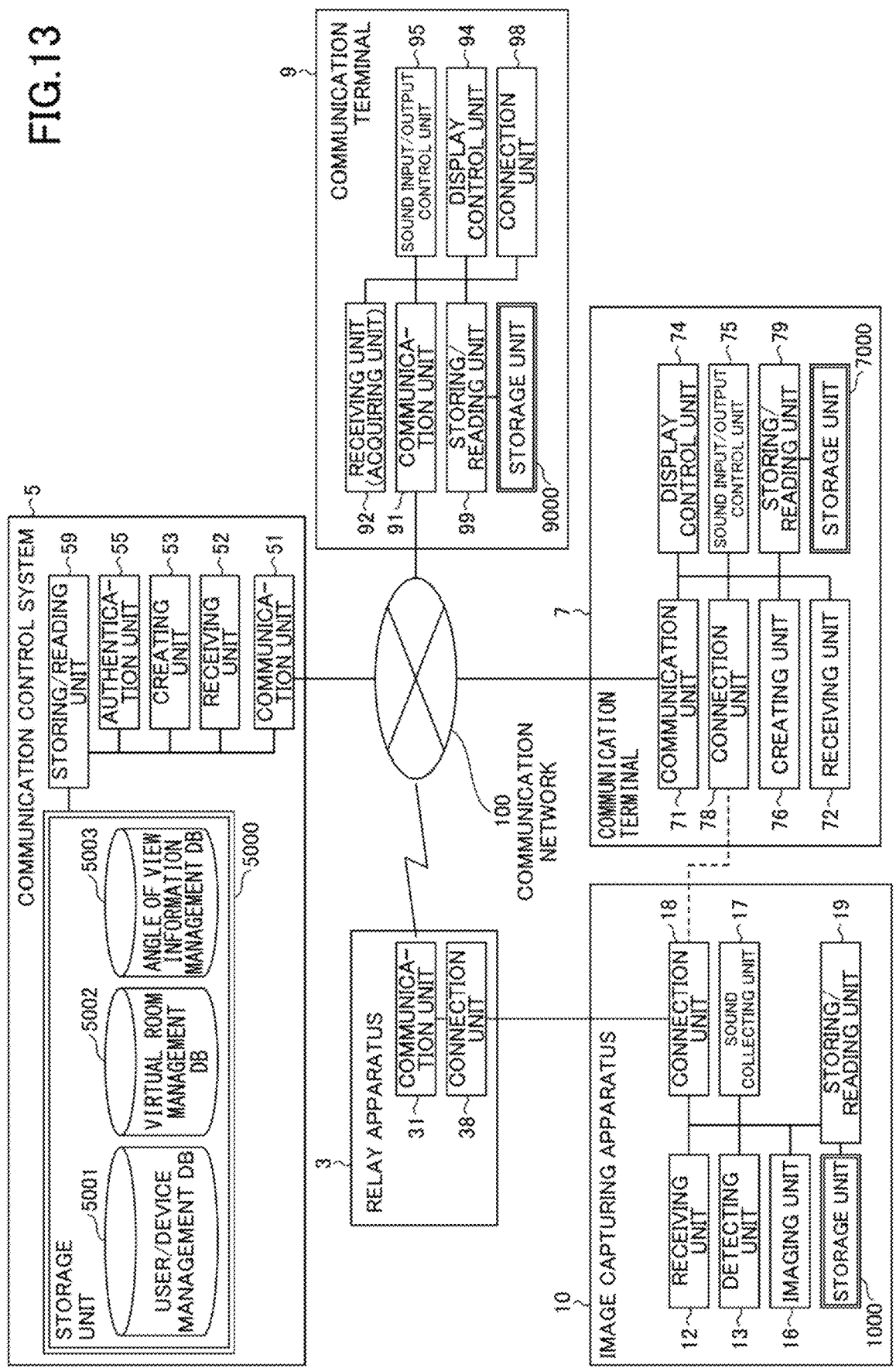
FIG. 13 is a functional configuration diagram of a communication system according to the first embodiment of the present invention.

As illustrated in FIG. 13, the image capturing apparatus 10 includes a receiving unit 12, a detecting unit 13, an imaging unit 16, a sound collecting unit 17, a connection unit 18, and a storing/reading unit 19. These units are functions or means implemented by operating any of the elements illustrated in FIG. 10 by instructions from the CPU 111 in accordance with a program for image capturing storage loaded from the SRAM 113 to the DRAM 114.

The image capturing apparatus 10 also includes a storage unit 1000 constructed by the ROM 112, the SRAM 113, and the DRAM 114 illustrated in FIG. 9.

(Each Functional Configuration of the Image Capturing Apparatus)

The receiving unit 12 of the image capturing apparatus 10 is implemented by processing of the operation unit 115 with respect to the CPU 111, and receives operation input from the user.

The detecting unit 13 is implemented mainly by processing from the CPU 111 with respect to the electronic compass 118, the gyro sensor 119, the acceleration sensor 120, etc., and detects the attitude of the image capturing apparatus 10 to obtain attitude information.

The imaging unit 16 is implemented mainly by processing from the CPU 111 with respect to the imaging unit 101, the image processing unit 104, the imaging control unit 105, and the CPU 111, and captures a landscape, etc., and obtains a captured image.

The sound collecting unit 17 is implemented mainly by processing from the CPU 111 with respect to the sound processing unit 109, and collects sound around the image capturing apparatus 10.

The connection unit 18 is implemented mainly by processing from the CPU 111 with respect to the input/output I/F 116, and performs data communication with the relay apparatus 3.

The storing/reading unit 19 is implemented mainly by processing of the CPU 111, and stores various kinds of data (or information) in the storage unit 1000 and reads various kinds of data (or information) from the storage unit 1000.

<Functional Configuration of Relay Apparatus>

As illustrated in FIG. 13, the relay apparatus 3 includes a communication unit 31 and a connection unit 38. These units are functions or means implemented by operating any of the elements illustrated in FIG. 11 by instructions from the CPU 301 in accordance with a program for the relay apparatus 3 loaded from the EEPROM 304 into the RAM 303.

(Each Functional Configuration of the Relay Apparatus 3)

The communication unit 31 of the relay apparatus 3 is implemented mainly by processing from the CPU 301 illustrated in FIG. 11 with respect to the communication unit 313, and performs data communication between the image capturing apparatus 10 and the communication control system 5 via the communication network 100.

The connection unit 38 is implemented mainly by processing from the CPU 301 with respect to the input/output I/F 316, and performs data communication with the image capturing apparatus 10.

<Functional Configuration of Communication Control System>

Next, each functional configuration of the communication control system 5 will be described in detail with reference to FIG. 13. The communication control system 5 includes a communication unit 51, a receiving unit 52, a creating unit 53, an authentication unit 55, and a storing/reading unit 59. Each of these units is a function or means implemented by operating any of the elements illustrated in FIG. 12 by an instruction from the CPU 501 in accordance with a program for the communication control system 5 loaded into the RAM 503 from the SSD 504.

The communication control system 5 also includes the RAM 503 illustrated in FIG. 12 and a storage unit 5000 constructed by the SSD 504. In the storage unit 5000, a user/device management DB 5001, a virtual room management DB 5002, and an angle of view information management DB 5003 are constructed.

(User/Device Management DB)

FIG. 14 is a conceptual diagram of the user/device management DB. The user/device management DB 5001 is configured in a table format, and a user ID (or device ID), a password, a name, a user image, and an IP address are stored and managed in association with each other.

Among these, the user ID is an example of user identification information for identifying a user (organizer X, participants A, B). The device ID is an example of device identification information for identifying a device such as the image capturing apparatus 10. When a head-mounted display or the like is used in addition to the image capturing apparatus 10, the head-mounted display or the like is also treated as a device.

The name is the name of the user or the device.

The user image is an image schematizing the face of each user, an image of a photograph of the face of the user, etc., and is registered by each user in advance.

The IP address is an example of destination identification information of devices such as the communication terminals 7 and 9 and the image capturing apparatus 10 used by the user.

(Virtual Room Management DB)

FIG. 15 is a conceptual diagram of the virtual room management DB 5002. The virtual room management DB 5002 is configured in a table format, and a virtual room ID, a virtual room name, a device ID, an organizer ID, a participant ID, a content ID, a content URL (storage location information for image and sound content data), and an angle of view information URL (storage location information of the angle of view information management DB) are stored and managed in association with each other.

Among these, the virtual room ID is an example of virtual room identification information for identifying a virtual room.

The virtual room name is the name of the virtual room and is given by a user, etc.

The device ID corresponds to the device ID of FIG. 14, and is the ID of the device that participated in the virtual room indicated by the virtual room ID of the same record.

The organizer ID is an example of the organizer identification information for identifying particularly the organizer ID among the user IDs of FIG. 14, and is the ID of the organizer that participated in the virtual room indicated by the virtual room ID of the same record.

The participant ID is an example of the participant identification information for identifying particularly the participant ID among the user IDs of FIG. 14, and is the ID of the participant that participated in the virtual room indicated by the virtual room ID of the same record.

The content ID is an example of the content identification information for identifying image and sound content data. In this case, the image is a wide visual field image obtained at the time of image capturing, and the sound is a sound (including voices) obtained at the time of the same image capturing.

The content URL is an example of content storage location information indicating a location where content data (wide visual field images and sound information) is stored. The content URL is also stored in association with the content data and the time when the content data was captured and recorded.

The angle of view information URL is an example of the angle of view storage location information indicating the location where the angle of view information management DB 5003 illustrated in FIG. 16 is stored.

(Angle of View Information Management DB)

FIG. 16 is a conceptual diagram of the angle of view information management DB 5003. The angle of view information management DB 5003 is configured in a table format, and a user ID, an IP address, angle of view information (pan, tilt, fov), and a time stamp (or elapsed playback time) are stored and managed in association with each content ID. Note that the time stamp may be indicated as the elapsed recording time.

Among these, the user ID corresponds to the user ID illustrated in FIG. 14.

The IP address corresponds to the IP address illustrated in FIG. 14.

The angle of view information (pan, tilt, fov) is the angle of view information sent from the communication terminals 7 and 9 of the user (organizer and participant) indicated by the user ID of the same record.

The time stamp indicates the time at which the angle of view information of the same record was sent at the time of recording. At the end of recording, the storing/reading unit 59 described later converts the time stamp into the elapsed playback time. At the time of playback of the recorded content, the storing/reading unit 59 described later stores the elapsed playback time from the beginning. "Playback of the recorded content" may be simply denoted as "playback".

(Functional Configuration of Communication Control System)

Next, each functional configuration of the communication control system 5 will be described in detail with reference to FIG. 13.

The communication unit 51 of the communication control system 5 is implemented mainly by processing from the CPU 501 illustrated in FIG. 11 with respect to the network I/F 505, and performs data communication with other devices or the like (the relay apparatus 3, the communication terminals 7 and 9) through the communication network 100.

The receiving unit 52 is implemented by processing of the operation unit 508 with respect to the CPU 501, and receives operation input from a user (here, the system administrator, etc.).

The creating unit 53 serves as a screen creating unit, and is implemented mainly by processing of the CPU 501, and creates a screen for sending to each of the communication terminals 7 and 9 by using data, etc., stored in the storage unit 5000.

The authentication unit 55 authenticates whether each user is a valid person to use the virtual room.

The storing/reading unit 59 is implemented mainly by processing of the CPU 501, and stores various kinds of data (or information) in the storage unit 5000 and reads various kinds of data (or information) from the storage unit 5000.

<Functional Configuration of the Communication Terminal>

Next, the functional configuration of the communication terminal 7 will be described in detail with reference to FIG. 13. The communication terminal 7 includes a communication unit 71, a receiving unit 72, a display control unit 74, a sound input/output control unit 75, a creating unit 76, a connection unit 78, and a storing/reading unit 79. Each of these units is a function or means implemented by operating one of the elements illustrated in FIG. 12 by an instruction from the CPU 501 in accordance with a program for the communication terminal 7 loaded into the RAM 503 from the SSD 504.

The communication unit 71 of the communication terminal 7 is implemented mainly by processing from the CPU 501 illustrated in FIG. 11 with respect to the network I/F 505, and performs data communication with other devices or the like (the communication control system 5) via the communication network 100.

The receiving unit 72 is implemented mainly by processing of the operation unit 508 with respect to the CPU 501, and receives an operation input from a user (here, the organizer X). The receiving unit 97 also serves as an acquiring unit, and when the display of a predetermined area in the wide visual field image is received from the user, the receiving unit 97 acquires the angle of view information for identifying the predetermined area.

The display control unit 74 is implemented mainly by processing of the CPU 501, and performs control for displaying various images on the display 507 of the communication terminal 7 or an external display connected to the external device connection I/F 505.

The sound input/output control unit 75 is implemented mainly by processing of the CPU 501 with respect to the communication terminal 7, and performs control for collecting sound from an external microphone connected to the external device connection I/F 505. When the communication terminal 7 has a built-in microphone, the sound input/output control unit 75 performs control for collecting sound from the microphone. The sound input/output control unit 75 also performs control for outputting sound to the speaker 512 of the communication terminal 7 or an external speaker connected to the external device connection I/F 505.

The creating unit 76 is implemented mainly by the processing of the CPU 501, and adds narration, tickers, and the like to the content data captured and recorded by the communication terminal 7 to create content data such as for teaching materials.

The storing/reading unit 79 is implemented mainly by processing of the CPU 501, and stores various kinds of data (or information) in a storage unit 7000 and reads various kinds of data (or information) from the storage unit 7000.

<Functional Configuration of Communication Terminal>

Next, each functional configuration of the communication terminal 9 will be described in detail with reference to FIG. 13.

The communication terminal 9 includes a communication unit 91, a receiving unit 92, a display control unit 94, a sound input/output control unit 95, a connection unit 98, and a storing/reading unit 99. Each of these units is a function or means implemented by operating one of the elements illustrated in FIG. 12 by an instruction from the CPU 501 in accordance with a program for the communication terminal 9 loaded into the RAM 503 from the SSD 504.

The communication terminal 9 also includes the RAM 503 illustrated in FIG. 12 and a storage unit 9000 constructed by the SSD 504.

The communication unit 91 of the communication terminal 9 is implemented mainly by processing from the CPU 501 with respect to the network I/F 505, and performs data communication with other devices or the like (the communication control system 5) via the communication network 100.

The receiving unit 92 is implemented mainly by processing of the operation unit 508 with respect to the CPU 501, and receives operation input from a user (here, a participant). The receiving unit 92 also serves as an acquiring unit, and acquires angle of view information for identifying the predetermined area when the display of the predetermined area in the wide visual field image is received from the user.

The display control unit 94 is implemented mainly by processing of the CPU 501, and performs control for displaying various images on the display 507 of the communication terminal 9 or an external display connected to the external device connection I/F 505.

The sound input/output control unit 95 is implemented mainly by processing of the CPU 501 of the communication terminal 9, and performs control for collecting sound from an external microphone connected to the external device connection I/F 505. If the communication terminal 7 has a built-in microphone, the sound input/output control unit 95 performs control for collecting sound from the microphone. The sound input/output control unit 95 performs control for outputting sound to the speaker 512 of the communication terminal 9 or an external speaker connected to the external device connection I/F 505.

The connection unit 98 is implemented mainly by processing from the CPU 501 with respect to the external device connection I/F 505, and performs data communication with the external device connected by in a wired or wireless manner.

The storing/reading unit 99 is implemented mainly by processing of the CPU 501, and stores various kinds of data (or information) in the storage unit 9000 and reads various kinds of data (or information) from the storage unit 9000.

[Processing or Operation of First Embodiment]

Next, the processing or operation of the first embodiment will be described with reference to FIGS. 17 to 26. The following processing is already performed after the image capturing apparatus 10 and the communication terminals 7 and 9 participate in the same virtual room.

<Communication Processing of Content Data in Communication System>

Figure 17:
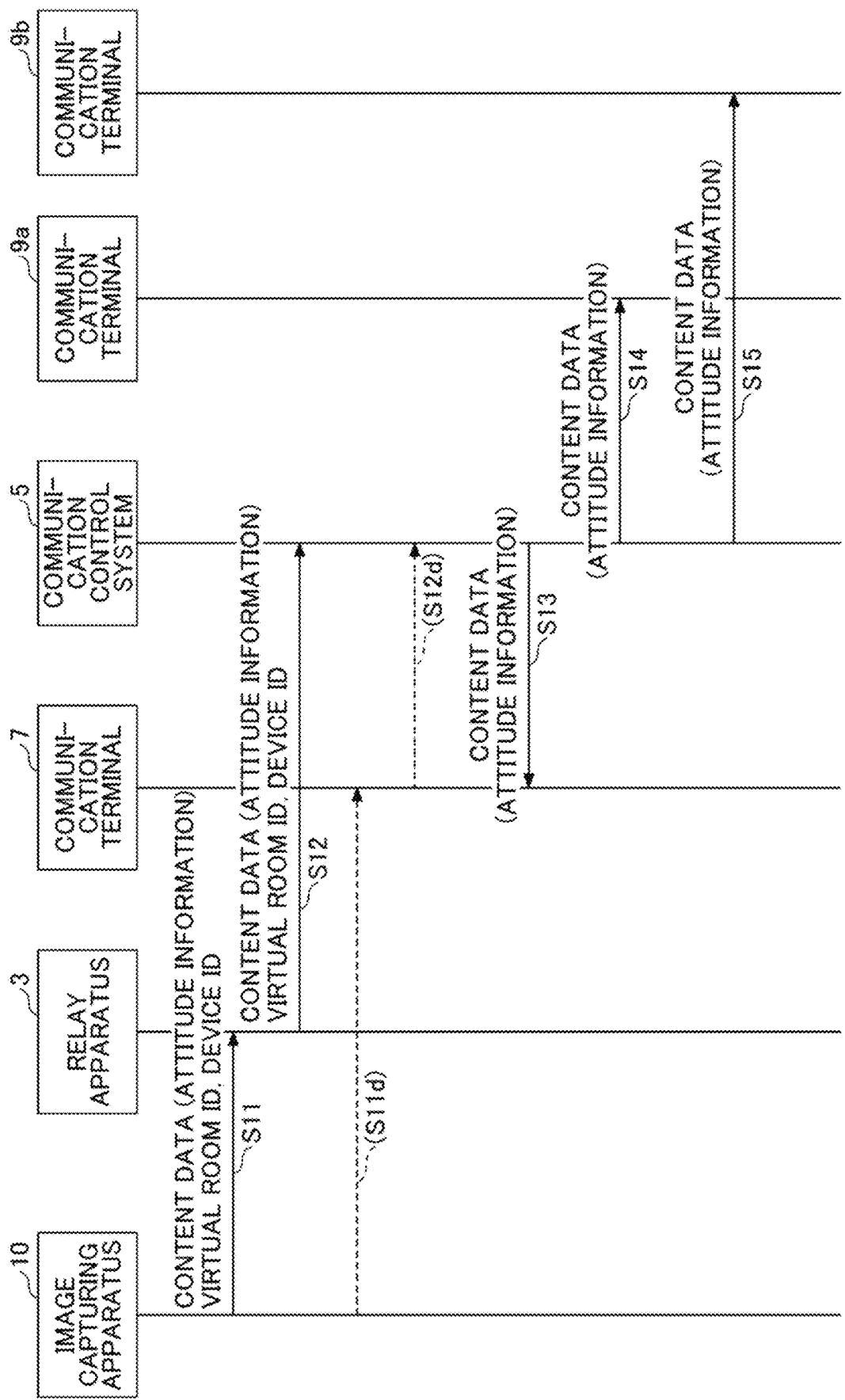
FIG. 17 is a sequence diagram illustrating communication processing of content data in a communication system according to the first embodiment of the present invention.

First, communication processing of content data in the communication system 1a will be described with reference to FIG. 17. FIG. 17 is a sequence diagram illustrating communication processing of content data in the communication system. In the present embodiment, a case where the image capturing apparatus 10, the communication terminal 7 of the organizer X, the communication terminal 9a of the participant A, and the communication terminal 9b of the participant B are in the same virtual room will be described. When the virtual room is constructed, the storing/reading unit 79 adds one record to the virtual room management DB 5002 (see FIG. 15), and manages the virtual room ID, the virtual room name, the device ID, the organizer ID, and the participant ID in association with each other. The content ID, the content URL, and the angle of view information URL are stored later. The processes S11 to S15 in FIG. 17 are repeated, for example, 30 or 60 times per second.

S11: In the image capturing apparatus 10, the imaging unit 16 captures a fully spherical image of the area Sa and collects sound to obtain content data (wide visual field image and sound information), and then the connection unit 18 sends the content data to the relay apparatus 3. The detecting unit 13 detects the attitude of the image capturing apparatus 10, and the connection unit 18 also sends the attitude information as metadata of the content data. In this case, the connection unit 18 also sends a virtual room ID for identifying the virtual room in which the image capturing apparatus 10 participates and a device ID for identifying the image capturing apparatus 10. As a result, the connection unit 38 of the relay apparatus 3 acquires content data, a virtual room ID, and a device ID.

S12: In the relay apparatus 3, the communication unit 31 transmits the content data, a virtual room ID, and a device ID acquired by the connection unit 38 in the processing in S11 to the communication control system 5 via the communication network 100. Thus, in the communication control system 5, the communication unit 51 receives the content data, a virtual room ID, and a device ID.

The image capturing apparatus 10 may transmit the content data, a virtual room ID, a device ID, and attitude information to the communication terminal 7 instead of the relay apparatus 3 (S11d). In this case, the communication terminal 7 transmits the content data, a virtual room ID, and a device ID to the communication control system 5 (S12d).

S13: In the communication control system 5, the storing/reading unit 59 searches the virtual room management DB 5002 based on the virtual room ID received in the process of S12, and reads out the user ID (organizer ID and participant ID) participating in the same virtual room as the image capturing apparatus 10. Further, the storing/reading unit 59 reads the user image of the corresponding organizer X and the IP address of the communication terminal 7 by searching the user/device management DB 5001 based on the read organizer ID and the participant ID, and reads the user images of the corresponding participants A, B and the IP addresses of the communication terminals 9a, 9b. Then, the communication unit 51 refers to the IP address of the communication terminal 7 and transmits the content data received in the processing S12 to the communication terminal 7. Thus, the communication unit 71 of the communication terminal 7 receives the content data. At this time, the communication unit 51 may transmit the content data to the communication terminal 7 in a state in which each user image and user ID of a user participating in the same virtual room to the communication terminal 7 are associated with the content data.

S14: The communication unit 51 of the communication control system 5 refers to the IP address of the communication terminal 9a and transmits the content data received in the processing in S12 to the communication terminal 9a. As a result, the communication unit 91 of the communication terminal 9a receives the content data. At this time, the communication unit 51 may transmit the content data to the communication terminal 9a in a state in which each user image and user ID of a user participating in the same virtual room are associated with the content data.

S15: Similarly, the communication unit 51 of the communication control system 5 refers to the IP address of the communication terminal 9b and transmits the content data received in the processing in S12 to the communication terminal 9b. Thus, the communication unit 91 of the communication terminal 9b receives the content data. At this time, the communication unit 51 may transmit the content data to the communication terminal 9b in a state in which each user image and user ID of the user participating in the same virtual room are associated with the content data.

By the above process, for example, in the communication terminal 9a, the display control unit 94 displays a predetermined area image (see FIG. 6B) indicating a predetermined area (see FIG. 6A) set in advance among the wide visual field images received in the processing in S14, and the sound input/output control unit 95 outputs sound based on the sound information received in the processing in S14. Further, the receiving unit 92 receives the screen operation of the participant A, and the display control unit 94 changes the predetermined area T (see FIG. 6A) set in advance to display a predetermined area image (see FIG. 6D) indicating the predetermined area T' (see FIG. 6C) where the object of interest of the participant A is displayed.

<Processing to Start Image Recording and Sound Recording in the Communication System>

Figure 18:
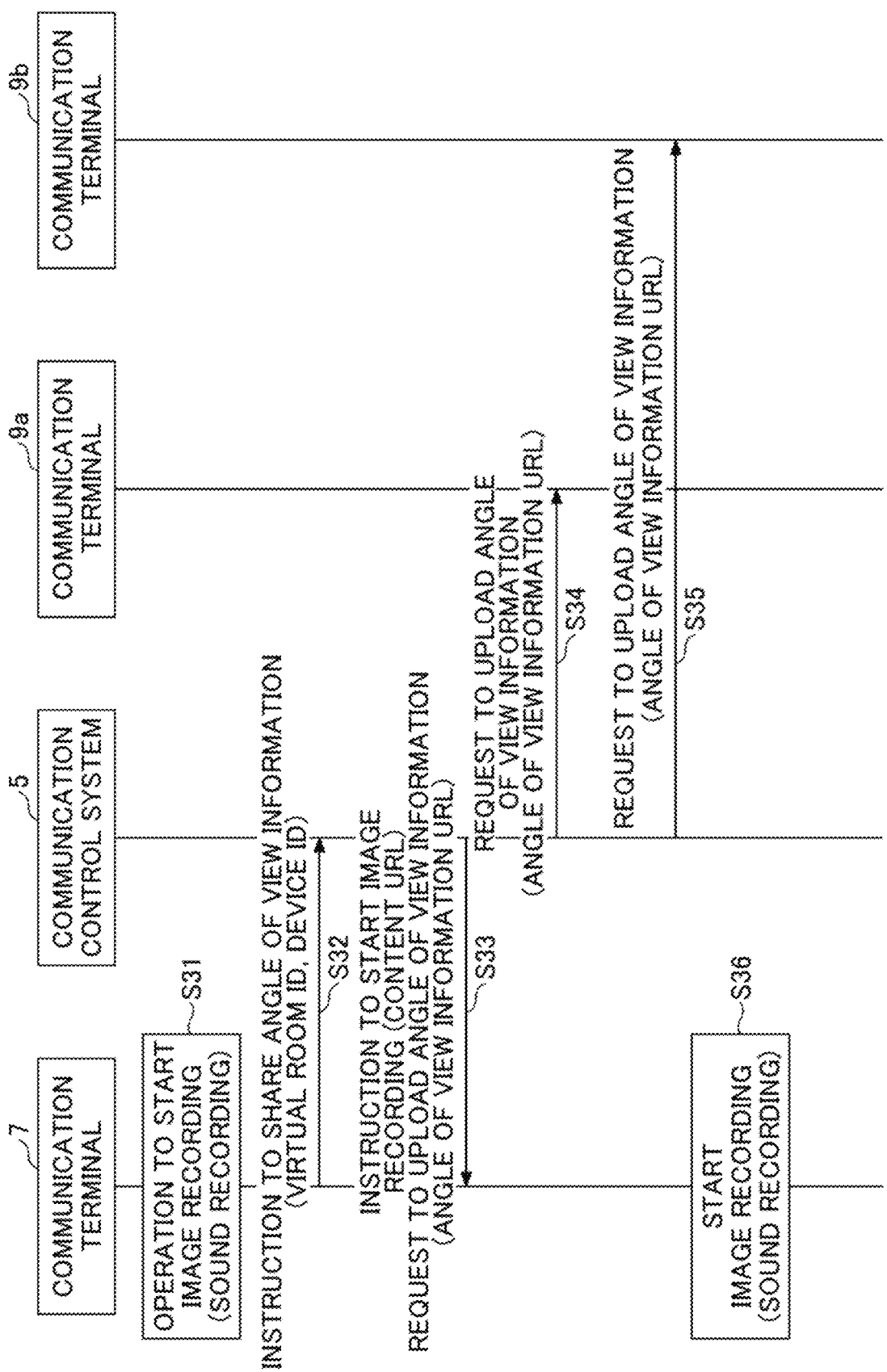
FIG. 18 is a sequence diagram illustrating processing to start image recording and sound recording in a communication system according to the first embodiment of the present invention.

Next, the processing to start image recording and sound recording in the communication system 1a will be described with reference to FIG. 18. FIG. 18 is a sequence diagram illustrating processing to start image recording and sound recording in the communication system.

S31: First, in the communication terminal 7 of the organizer X, a receiving unit 72 receives from the organizer X an operation to start image recording and sound recording.

S32: In the communication terminal 7, before starting the image recording and sound recording, the communication unit 71 transmits an instruction for sharing the angle of view information to the communication control system 5. The instruction for sharing includes the virtual room ID of the virtual room in which the communication terminal 7 participates and the device ID of the image capturing apparatus 10. Accordingly, the communication unit 51 of the communication control system 5 receives the instruction for sharing the angle of view information.

S33: In the communication control system 5, the storing/reading unit 59 sets the content URL and the angle of view information URL of the virtual room management DB 5002 (see FIG. 15). Then, the communication unit 51 transmits a recording start instruction and an upload request of the angle of view information to the communication terminal 7. The instruction includes information indicating a content URL indicating a place where the communication terminal 7 stores the content data after recording. The request also includes information indicating an angle of view information URL for maintaining the angle of view information. Thus, in the communication terminal 7, the communication unit 71 receives a recording start instruction and a request for uploading the angle of view information.

S34: Further, the communication unit 51 transmits a request for uploading the angle of view information to the communication terminal 9a. The request includes information of a URL for maintaining the angle of view information. Accordingly, in the communication terminal 9a, the communication unit 91 receives a request for uploading the angle of view information.

S35: Similarly, the communication unit 51 transmits a request for uploading the angle of view information to the communication terminal 9b. The request includes information of a URL for maintaining the angle of view information. Accordingly, in the communication terminal 9b, the communication unit 91 receives a request for uploading the angle of view information.

S36: Subsequently, in the communication terminal 7, the storing/reading unit 79 serves as an image recording unit and a sound recording unit, and starts image recording and sound recording of the content data received in the processing in S13 illustrated in FIG. 17. In the processing in S12d illustrated in FIG. 17, the communication terminal 7 may start image recording and sound recording of the content data received from the image capturing apparatus 10 by the processing in S11d; not the content data received from the communication control system 5 by the processing in S13.

<Process for Sharing Angle of View Information in the Communication System>

Figure 19:
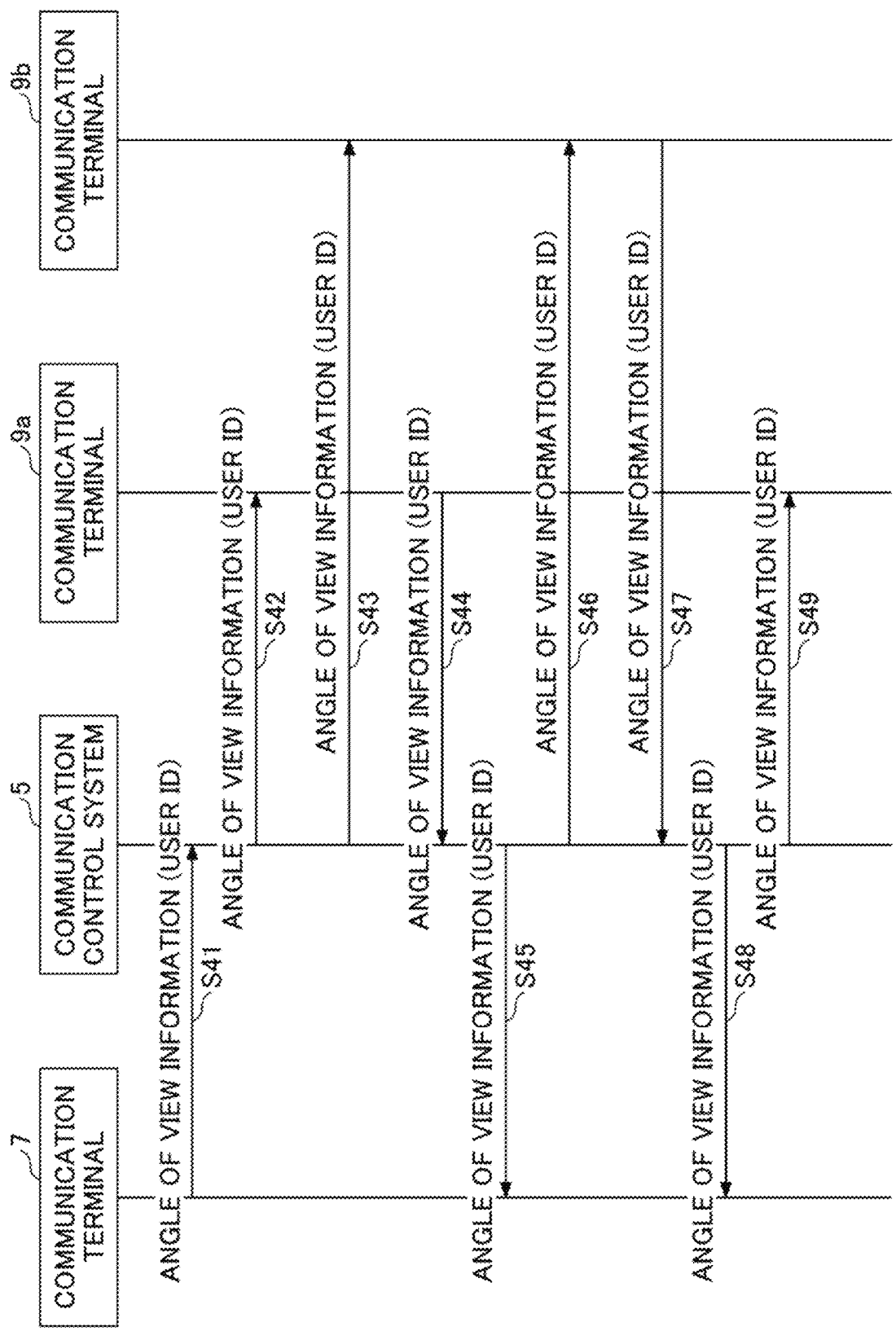
FIG. 19 is a sequence diagram illustrating processing of sharing angle of view information in a communication system according to the first embodiment of the present invention.

Next, processing for sharing angle of view information in the communication system 1a will be described with reference to FIG. 19. FIG. 19 is a sequence diagram illustrating processing for sharing angle of view information in the communication system.

S41: In the communication terminal 7, for example, when the receiving unit 72 receives a change of the angle of view from the organizer X while displaying the predetermined area image (see FIG. 6B) which is of the predetermined area (see FIG. 6A) of the wide visual field image received in the processing in S13, the display control unit 74 displays the predetermined area image (see FIG. 6D) which is of the predetermined area (see FIG. 6C) after the change of the same wide visual field image. In this case, the receiving unit 72 also serves as an acquiring unit, and when the display of a predetermined area in the wide visual field image is received from the user (here, the organizer X), the receiving unit acquires angle of view information (pan, tilt, fov) for identifying the predetermined area to be displayed on the display 507 in the wide visual field image. Then, the communication unit 71 transmits the angle of view information for identifying the changed predetermined area to the image information URL (the communication control system 5) received in the processing in S33. The angle of view information includes the user ID of the organizer X of the communication terminal 7 which is the transmission source. Thus, in the communication control system 5, the communication unit 51 receives the angle of view information. Then, the storing/reading unit 79 stores the user ID, the IP address of the transmission source, the angle of view information, and the time stamp in the angle of view information management DB 5003 (see FIG. 16). The time stamp indicates the time at which the angle of view information was received by the processing in S37.

S42: In the communication control system 5, the communication unit 51 transmits (transfers) the angle of view information received by the processing in S41 to the communication terminal 9a. The angle of view information includes the user ID of the organizer X. Thus, in the communication terminal 9a, the communication unit 91 receives the angle of view information.

S43: Similarly, in the communication control system 5, the communication unit 51 transmits (transfers) the angle of view information received in the processing in S41 to the communication terminal 9b. The angle of view information includes the user ID of the organizer X. Thus, in the communication terminal 9b, the communication unit 91 receives the angle of view information.

S44: Also, in the communication terminal 9a and the communication control system 5, the same processing as in the processing S41 is performed independently of the processing S41. Note that the user ID transmitted in this case is the user ID of the participant A.

S45: In the communication control system 5, the communication unit 51 transmits (transfers) the angle of view information received in the processing in S44 to the communication terminal 7. The angle of view information includes the user ID of the participant A. Thus, in the communication terminal 7, the communication unit 71 receives the angle of view information.

S46: Similarly, in the communication control system 5, the communication unit 51 transmits (transfers) the angle of view information received in the processing in S44 to the communication terminal 9b. The angle of view information includes the user ID of the participant A. Thus, in the communication terminal 9b, the communication unit 91 receives the angle of view information.

S47: Also, in the communication terminal 9b and the communication control system 5, the same processing as in the processing S41 is performed independently of the processing S41 and S44. Note that the user ID transmitted in this case is the user ID of the participant B.

S48: In the communication control system 5, the communication unit 51 transmits (transfers) the angle of view information received in the processing in S47 to the communication terminal 7. The angle of view information includes the user ID of the participant B. Thus, in the communication terminal 7, the communication unit 71 receives the angle of view information.

S49: Similarly, in the communication control system 5, the communication unit 51 transmits (transfers) the angle of view information received in the processing in S47 to the communication terminal 9b. The angle of view information includes the user ID of the participant B. Thus, in the communication terminal 9b, the communication unit 91 receives the angle of view information.

<Display of Map Image and Predetermined Area Image>

Figure 20:
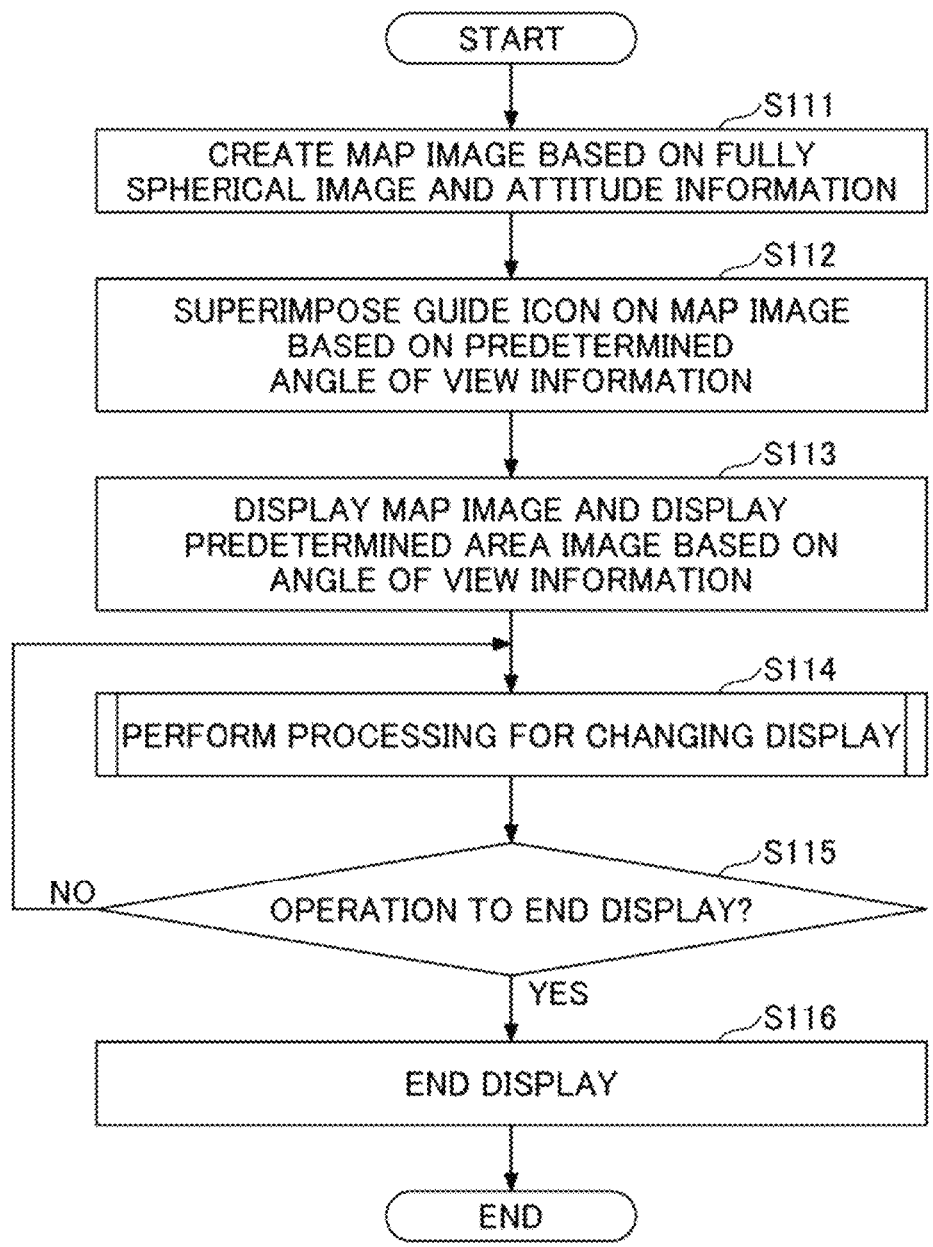
FIG. 20 is a flowchart illustrating processing of displaying a map image and a predetermined area image according to the first embodiment of the present invention.

Next, with reference to FIG. 20, processing for displaying a map image and a predetermined area image at the time of image recording and sound recording will be described. FIG. 20 is a flowchart illustrating processing for displaying a map image and a predetermined area image. Here, the process performed by the communication terminal 9a of the participant A will be described, and the process performed by the communication terminal 7 of the organizer X and the communication terminal 9b of the participant B will be similar. Further, a case where a fully spherical image is handled among wide visual field images will be described.

Figure 25:
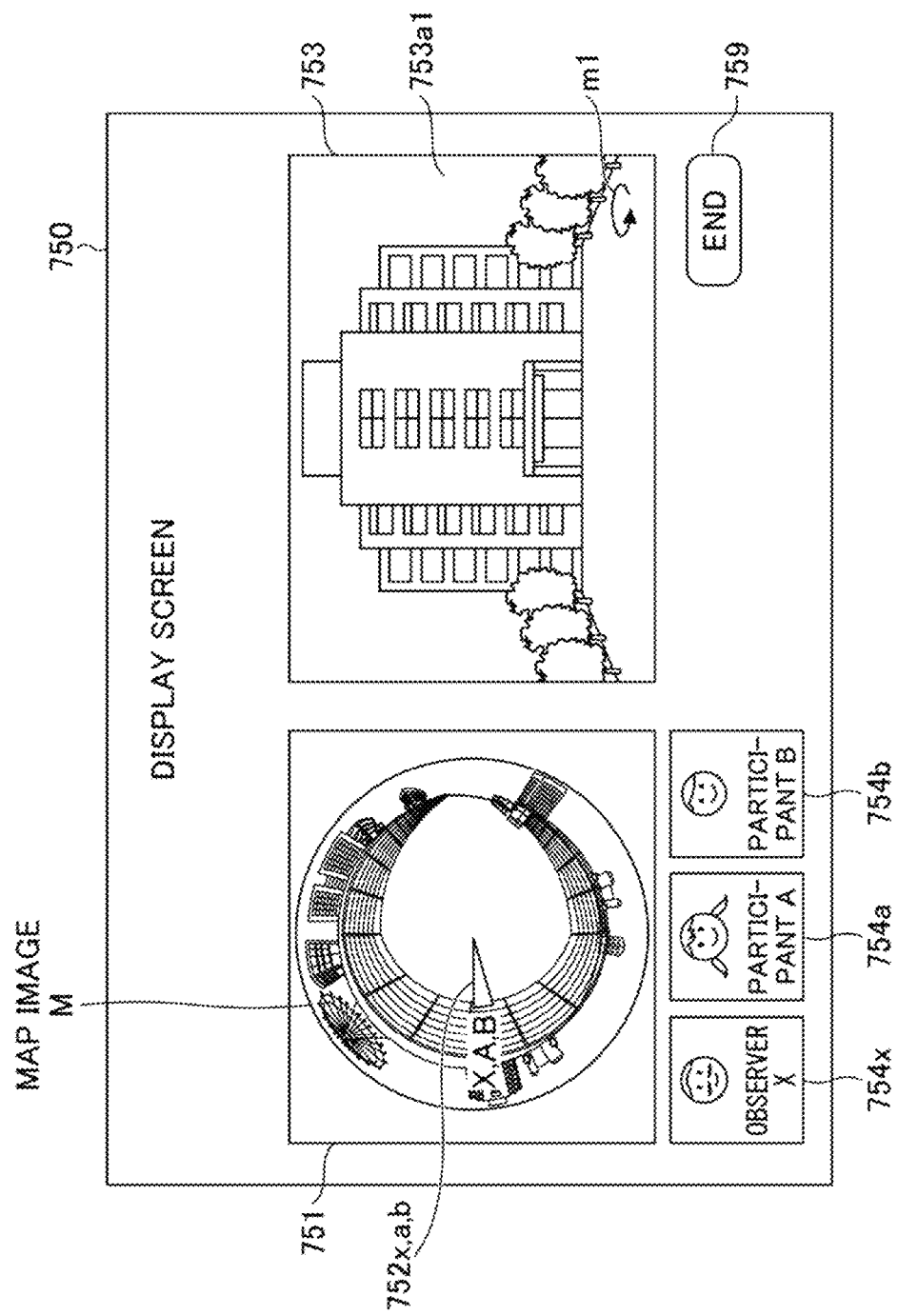
FIG. 25 is a diagram illustrating an initial display screen according to the first embodiment of the present invention.

S111: The display control unit 94 of the communication terminal 9a creates a map image M as illustrated in FIG. 25 based on the fully spherical image and attitude information among the content data received by the processing S14. The map image M is an example of a azimuthal equidistant projection image of the fully spherical image. At this point, the map image M has not yet been displayed. The method of creating the map image M will be described in detail later. The map image M is an image that visually represents an angle of view of a predetermined area indicating a predetermined area image displayed by each of the communication terminals 7, 9a, and 9b.

S112: The display control unit 94 superimposes guide icons 752x, 752a, and 752b on the map image M based on predetermined angle of view information. The guide icon 752x is an example of an angle of view display area in which angle of view information, which is for identifying a predetermined area indicating a predetermined area image displayed by the communication terminal 7, is visually represented on the map image M. Similarly, the guide icons 752a and 752b are examples of an angle of view display area in which angle of view information, which is for identifying a predetermined area indicating a predetermined area image displayed by the communication terminals 9a and 9b, is visually represented on the map image M. At this point, the guide icons 752x, 752a, and 752b are not yet displayed. The arrangement method of the guide icons 752x, 752a, and 752b will be described in detail later.

S113: As illustrated in FIG. 25, the display control unit 94 displays the display screen 750 on the display 507 of the communication terminal 9a. The display screen 750 includes a display area 751 for displaying the map image M, a display area 753 for a predetermined area image, and user images 754x, 754a, and 754b of each user who is communicating in the same virtual room. The display screen 750 also includes an "end" button 759 for ending the communication and display of the display screen 750.

In the display area 751, the map image M is displayed, and guide icons 752x, 752a, and 752b are displayed on the map image M. A user name (or user ID) is also displayed near the guide icons 752x, 752a, and 752b. Thus, it is easy for the participant A to identify which user's communication terminal 7, 9a, or 9b is displaying the predetermined area image to which the guide icons 752x, 752a, and 752b are relevant.

Each user name is transmitted from the communication control system 5 to each of the communication terminals 7, 9a, and 9b in a state associated with the user ID before the processing S41. Therefore, the storing/reading unit 59 of the communication control system 5 can read the user ID and the user name of each user in the same virtual room from the user/device management DB 5001 (see FIG. 14).

In the initial state, the guide icons 752x, 752a, and 752b are displayed in the same predetermined state. In this case, a predetermined area image 753a1 indicating a predetermined area identified by the angle of view information pertaining to the guide icon 752x (752a) is displayed on the display area 753.

A mark m1 is displayed on the display area 753. The mark m1 indicates that the user (here, the participant A) can change the predetermined area in the fully spherical image (see FIGS. 6A to 6C) to change the predetermined area image in the display area 753 (see FIGS. 6B to 6D).

The user images 754x, 754a, and 754b are transmitted from the communication control system 5 to the respective communication terminals 7, 9a, and 9b in a state associated with the user ID before the processing in S11. Therefore, the storing/reading unit 59 of the communication control system 5 can read the user ID and the user image of each user in the same virtual room from the user/device management DB 5001 (see FIG. 14).

S114: Next, the communication terminal 9a performs processing for changing the display of the display screen 750.

In the processing S111 to S114, the process of displaying the map image M and the predetermined area image by the communication terminal 9a has been described, but the processing is not limited to this. For example, in the communication control system 5, the creating unit 53 may create the map image M and the predetermined area image, and the communication unit 51 may transmit the map image M and the predetermined area image to the communication terminal 9a.

(Change of Guide Icon of Own Terminal)

Figure 21:
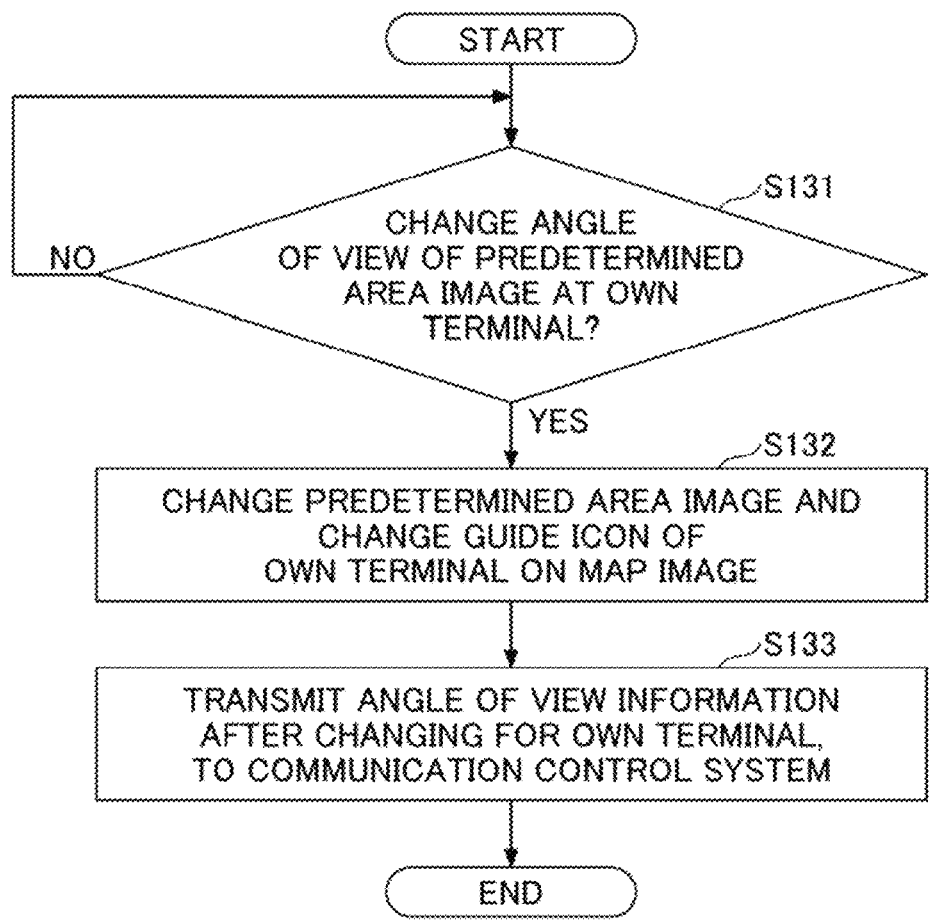
FIG. 21 is a flowchart illustrating processing of changing the position (direction) and size of the guide icon of the own terminal in response to a change in the predetermined area image according to the first embodiment of the present invention.

Here, with reference to FIG. 21, processing for changing the position (direction) and size of the guide icon of own terminal according to the change of the predetermined area image will be described. FIG. 21 is a flowchart illustrating processing of changing the position (direction) and size of the guide icon of the own terminal in response to a change in the predetermined area image.

S131: The receiving unit 92 of the communication terminal 9a receives an instruction from the user A to change the angle of view of the predetermined area image 735a1 at the own terminal (the communication terminal 9a) at any time (S131; NO).

S132: When the receiving unit 92 receives an instruction for the change of the predetermined area image from the user A by the movement of the cursor c1, etc. (S131; YES), the display control unit 94 changes from the predetermined area image 753a1 illustrated in FIG. 25 to the predetermined area image 753a2 illustrated in FIG. 26 in the display area 753. In response to the change to the predetermined area image 753a2, the display control unit 94 changes the guide icon 752a of the own terminal from the position (direction) and size illustrated in FIG. 25 to the position (direction) and size illustrated in FIG. 26.

S133: The communication unit 91 transmits angle of view information for identifying the predetermined area illustrating the changed predetermined area image of the own terminal to the communication control system 5. The angle of view information includes the user ID of the user A who is the transmission source. Thus, the communication unit 51 of the communication control system 5 receives the angle of view information. The process S133 corresponds to the processing in S44 of FIG. 19.

(Change of Guide Icon of Other Communication Terminal)

Figure 22:
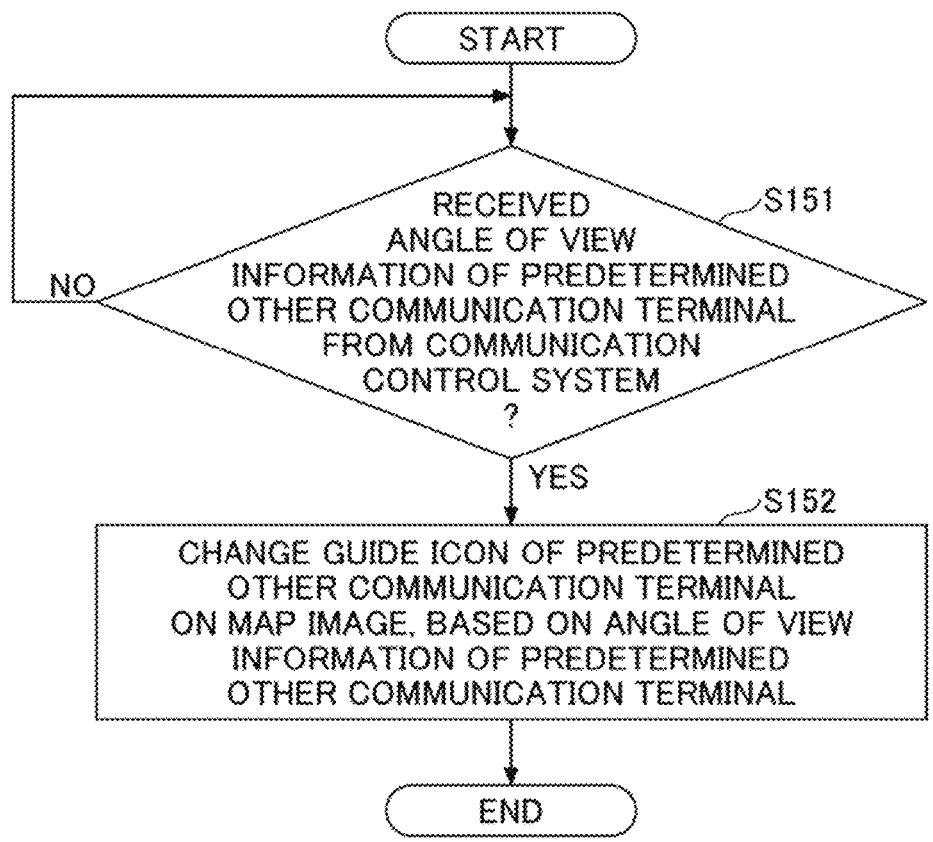
FIG. 22 is a flowchart illustrating processing of changing the position (direction) and size of the guide icon of another communication terminal based on the angle of view information of the other communication terminal according to the first embodiment of the present invention.

Next, with reference to FIG. 22, processing for changing the position (direction) and size of the guide icon of another communication terminal based on the angle of view information of the other communication terminal will be described. FIG. 22 is a flowchart illustrating processing for changing the position (direction) and size of the guide icon of another communication terminal based on the angle of view information of the other communication terminal.

S151: In the communication terminal 9a, the communication unit 91 receives the angle of view information of a predetermined other communication terminal from the communication control system 5 at any time (S151; NO).

Figure 26:
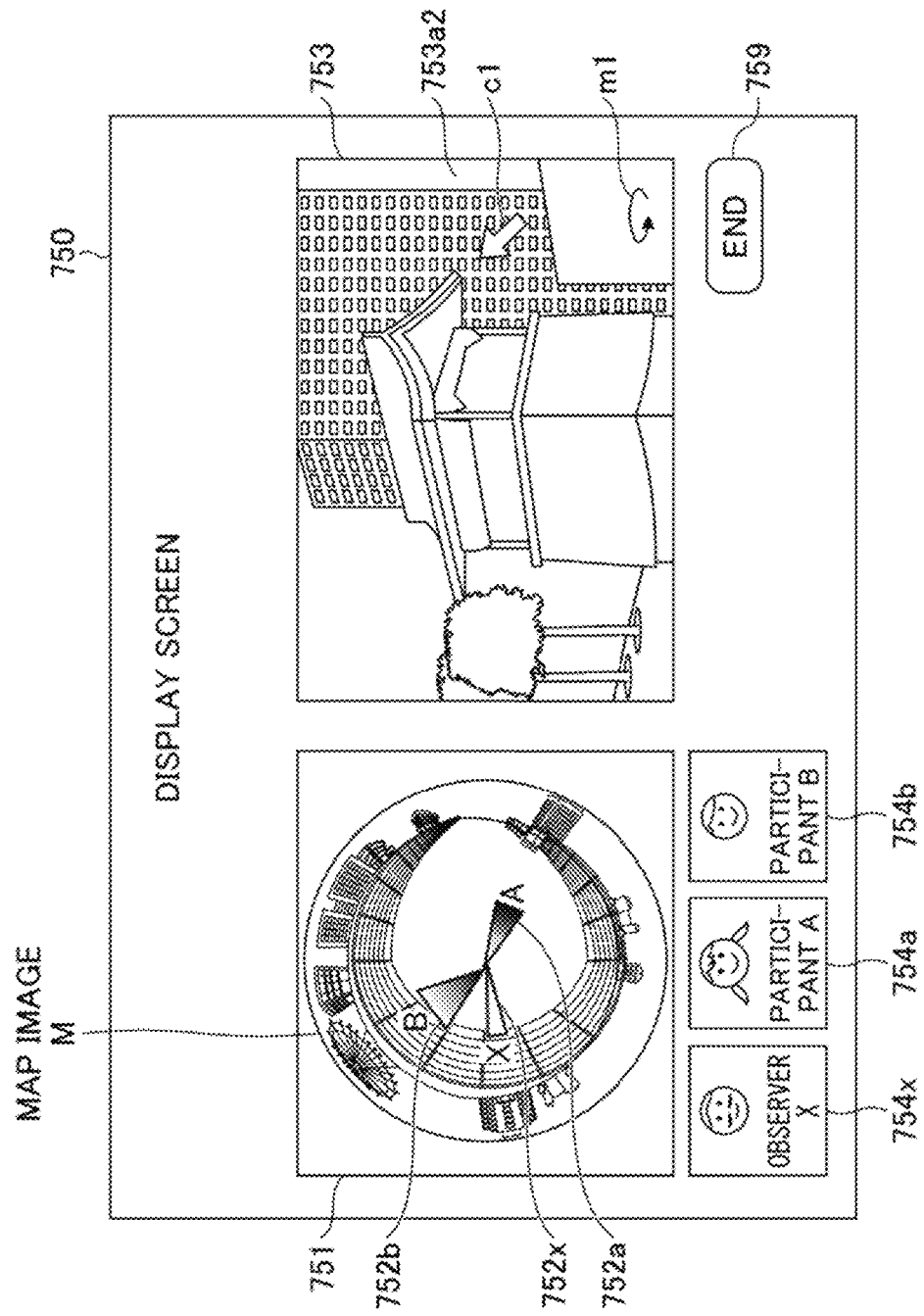
FIG. 26 is a diagram illustrating a display screen in a state in which the angle indicating the angle of view of a predetermined area and the angle of latitude are changed in a guide icon (angle of view display area) by changing a predetermined area image at a communication terminal according to the first embodiment of the present invention.

S152: When the communication unit 91 receives the angle of view information (S151; YES), the display control unit 94 changes the position (direction) and size of the guide icon of the predetermined other communication terminal on the map image M based on the angle of view information of the predetermined other communication terminal. This corresponds to, for example, the processing S49 of FIG. 19. Specifically, the guide icon 752b of the communication terminal 9b illustrated in FIG. 25 is changed as illustrated in FIG. 26.

(Map Image and Guide Icon)

Figure 27:
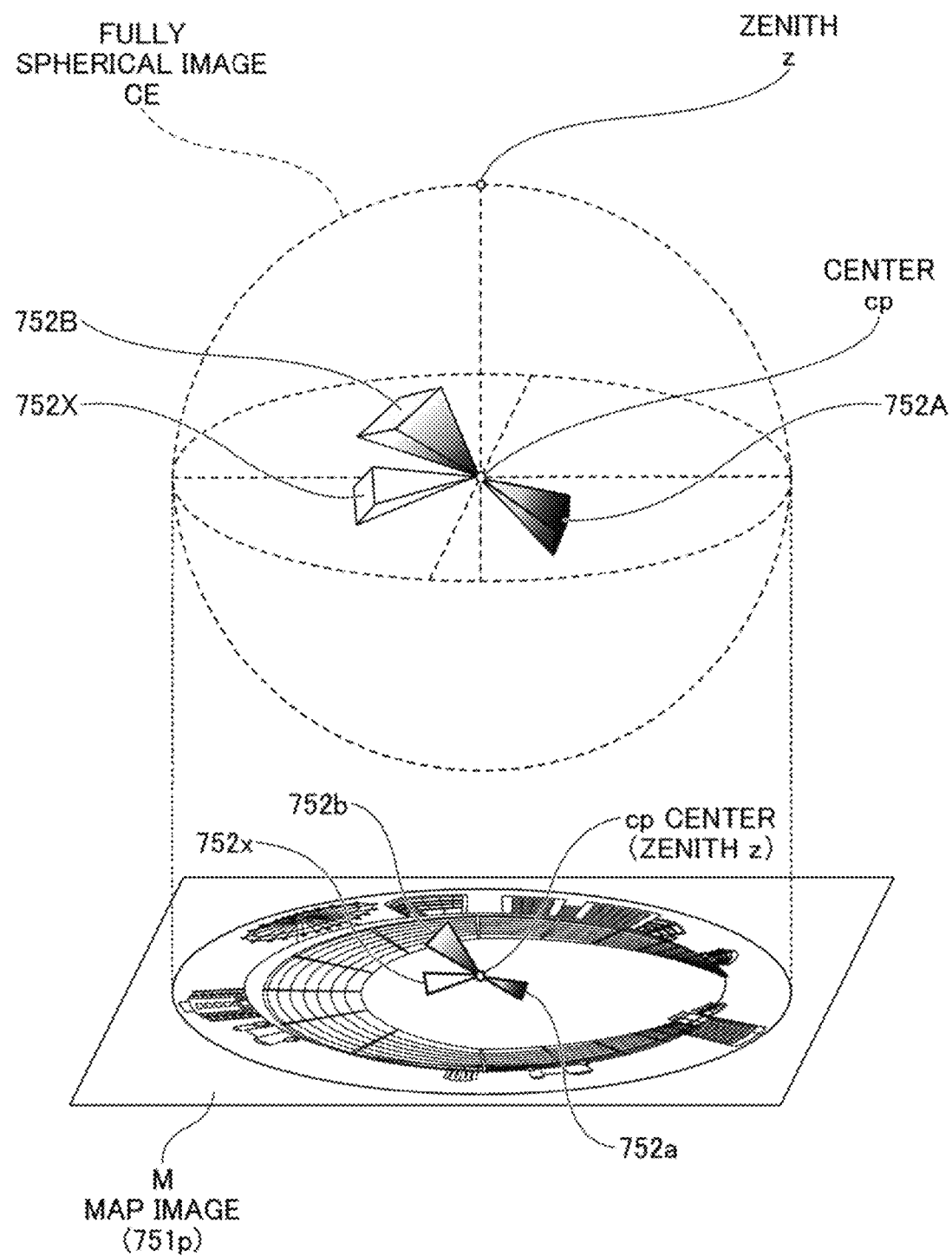
FIG. 27 is a diagram illustrating the relationship between a fully spherical image and a guide icon and an azimuthal equidistant projection image according to the first embodiment of the present invention.
Figure 28:
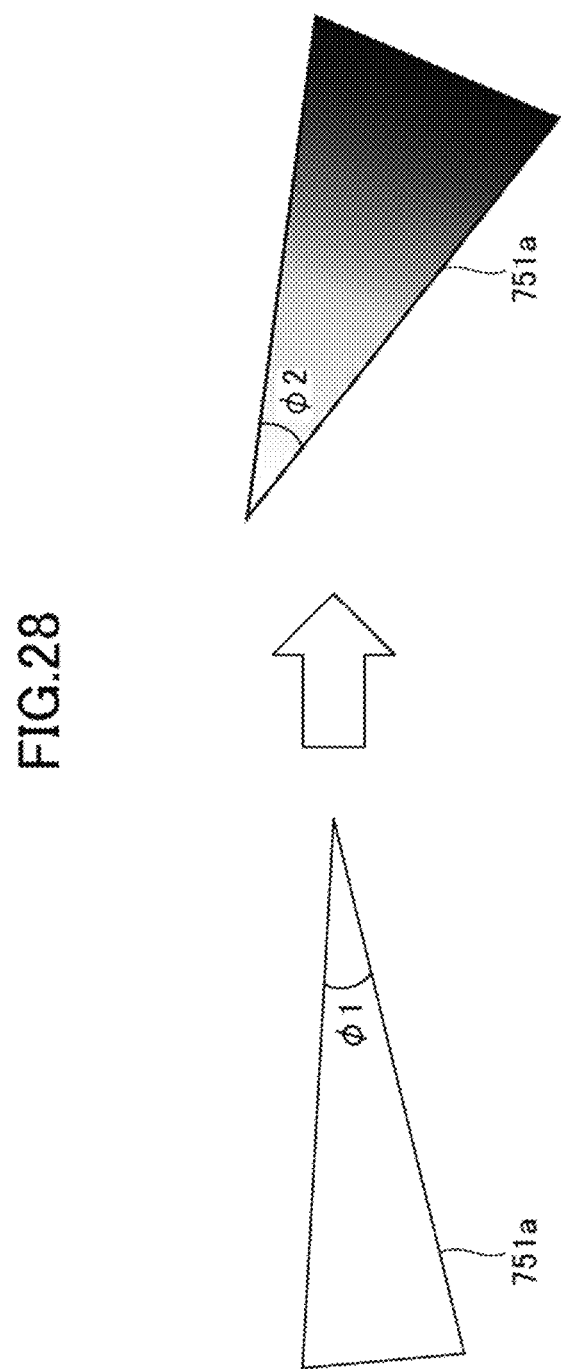
FIG. 28 is a diagram illustrating a state in which the position (direction) and size of the guide icon are changed according to the first embodiment of the present invention.

The relationship between the fully spherical image and the map image and the guide icon will now be described with reference to FIGS. 27 and 28. FIG. 27 is a diagram illustrating the relationship between the fully spherical image and the map image and the guide icon. FIG. 28 is a diagram illustrating the change state of the position (direction) and size of the guide icon.

As illustrated in FIG. 27, the display control unit 94 projects the fully spherical image CE from a predetermined position (the zenith of the earth) on the upward extension of the zenith z of the fully spherical image CE to the downward direction of the zenith z, to create a map image M which is a azimuthal equidistant projection image 751p. In the fully spherical image CE, the display control unit 94 sets the three-dimensional guide icons 752x, 752A, 752B which are the angle of view display areas illustrating the shape of the angle of view with respect to the predetermined areas displayed by the communication terminals 7, 9a, and 9b from the center cp of the fully spherical image CE.

The guide icons 752x, 752A, and 752B are represented by a gradation from the center cp of the fully spherical image CE to the predetermined area according to the latitude of the position of the predetermined area in the fully spherical image CE. For example, the guide icon 752X indicates an angle of view with respect to the predetermined area near the equator (latitude 0°), and the gradation is not displayed. On the other hand, the guide icon 752A indicates an angle of view with respect to the predetermined area whose latitude is lower than the equator, and the gradation is displayed such that the brightness on the center cp side is high and the brightness decreases as the predetermined area is approached. The guide icon 752B indicates an angle of view with respect to the predetermined area whose latitude is higher than the equator, and the gradation is displayed such that the brightness on the center cp side is low and the brightness increases as the predetermined area is approached.

The display control unit 94 also projects the guide icons 752X, 752A, and 752B onto the map image M by projecting the fully spherical image CE. As a result, the guide icons 752x, 752a, and 752b of a planar shape (two-dimensional) indicating the angle of view from the center cp (zenith z) of the map image M to the predetermined areas displayed by the communication terminals 7, 9a, and 9b, are superimposed on the map image M.

As a result, the gradation of the guide icons 752x, 752A, and 752B is reflected in the guide icons 752x, 752a, and 752b. The guide icons 752x, 752a, and 752b have a shape indicating an angle of view with respect to each predetermined area from the center of the planar map image M. This shape is a triangle having the center cp of the map image M as one vertex, and the inner angle at this one vertex is an angle corresponding to the angle of view of each predetermined area.

The change state of the position (direction) and size of the triangular guide icon 751a will now be described with reference to FIG. 28. FIG. 28 illustrates a state in which the position (direction) and size of the guide icon 751a are changed in response to the change from the predetermined area image 753a1 illustrated in FIG. 25 to the predetermined area image 753a2 illustrated in FIG. 26. Initially, in the triangle having the center cp of the map image M as one vertex, the inner angle at this one vertex is an angle φ1 corresponding to the angle of view. In response to the change from the predetermined area image 753a1 illustrated in FIG. 25 to the predetermined area image 753a2 illustrated in FIG. 26, the display control unit 94 changes the angle φ1 to φ2 and also changes the gradation.

S115: Next, when the receiving unit 72 does not receive an operation to end the display by pressing the "end" button 759 of the display screen 750 from the participant A (NO), the process returns to step S114.

S116: When the receiving unit 72 receives the operation to end the display by pressing the "end" button 759 of the display screen 750 from the participant A (S115; YES), the display control unit 94 ends the display of the display screen 750 and also ends the communication.

<Processing to Stop Image Recording and Sound Recording in the Communication System>

Figure 23:
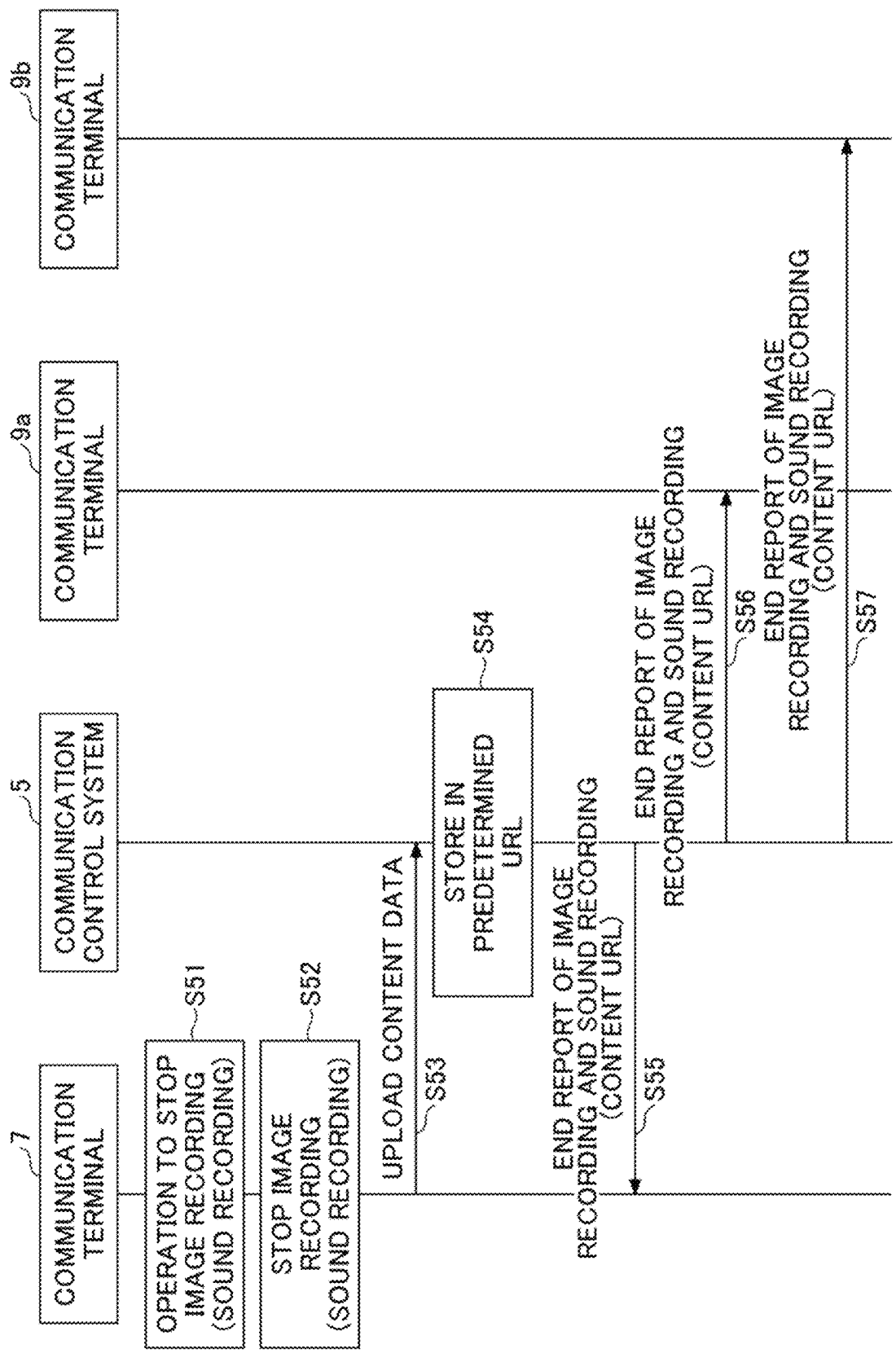
FIG. 23 is a sequence diagram illustrating processing of stopping image recording and sound recording in a communication system according to the first embodiment of the present invention.

Next, processing to stop image recording and sound recording in the communication system 1a will be described with reference to FIG. 23. FIG. 23 is a sequence diagram illustrating processing to stop image recording and sound recording in the communication system.

S51: First, in the communication terminal 7 of the organizer X, the receiving unit 72 receives the operation to stop image recording and sound recording from the organizer X.

S52: The storing/reading unit 79 stops image recording and sound recording of the content data.

S53: The communication unit 71 uploads (transmits) the content data obtained by image recording and sound recording to the predetermined content URL (the communication control system 5) received in the processing in S33. The content data includes a time (time stamp) from the start to the end of the image recording and sound recording. Thus, in the communication control system 5, the communication unit 51 receives the content data.

S54: In the communication control system 5, the storing/reading unit 59 stores the content data together with a time stamp in a predetermined content URL. Further, the storing/reading unit 59 converts the time stamp managed in the angle of view information management DB (see FIG. 16) into a playback elapsed time (recording elapsed time) in accordance with the total recording time of the content data for which recording has been stopped.

S55: The communication unit 51 transmits the end report of image recording and sound recording to the communication terminal 7. The end report includes information indicating a predetermined content URL. Accordingly, the communication unit 71 of the communication terminal 7 receives the end report of the image recording and sound recording.

S56: Similarly, the communication unit 51 transmits the end report of image recording and sound recording to the communication terminal 9a. The end report includes information indicating a predetermined content URL. Accordingly, the communication unit 91 of the communication terminal 9a receives the end report of the image recording and sound recording.

S57: Similarly, the communication unit 51 transmits the end report of the image recording and sound recording to the communication terminal 9b. The end report includes information indicating a predetermined content URL. Accordingly, the communication unit 91 of the communication terminal 9b receives the end report of image recording and sound recording.

In the case of the processing S55, it is not necessary to include the predetermined content URL in the end report.

<Processing of Playback of Content Obtained by Image Recording and Sound Recording in Communication System>

Figure 24:
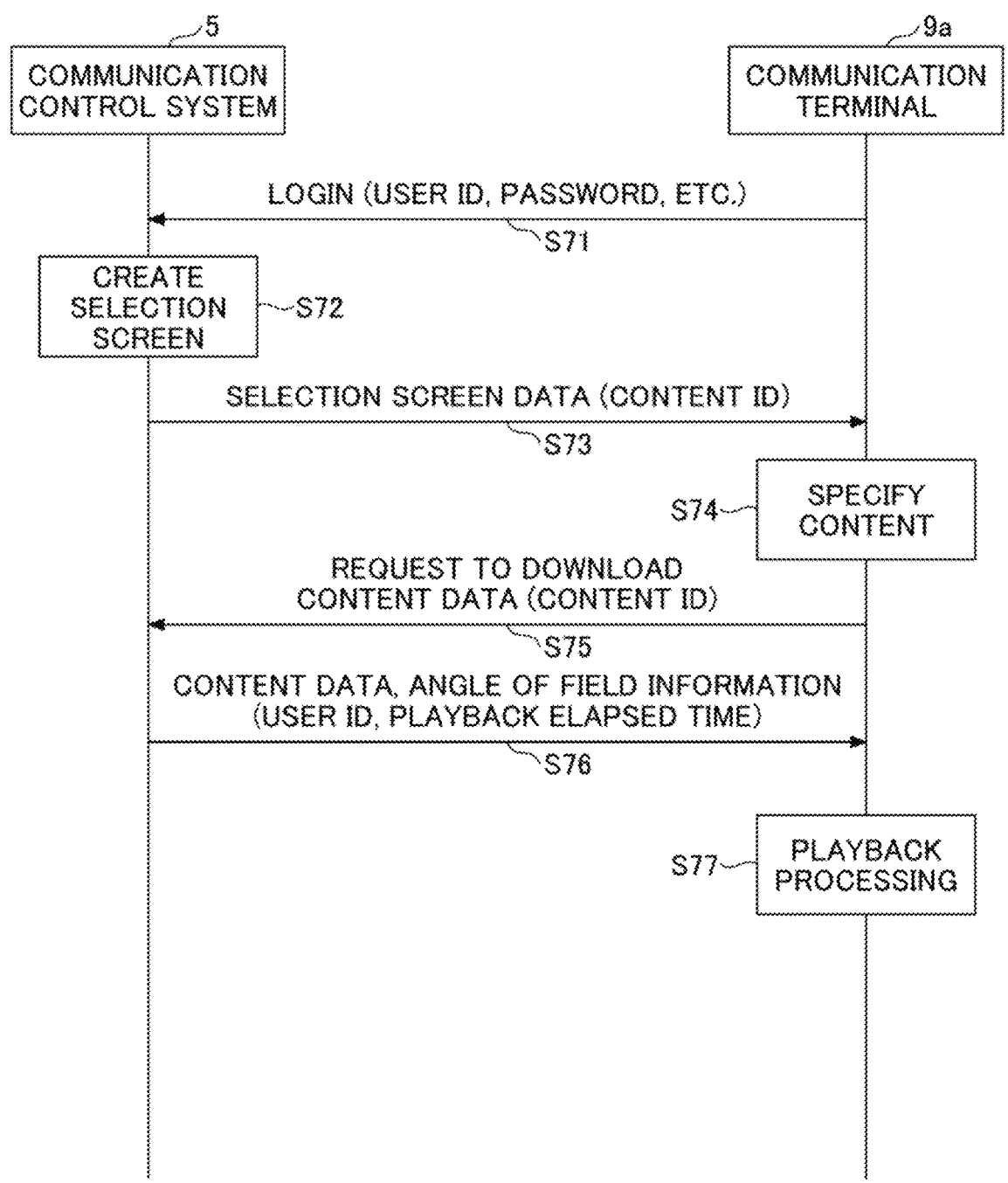
FIG. 24 is a sequence diagram illustrating processing of playback of content obtained by image recording and sound recording in a communication system according to the first embodiment of the present invention.

Next, processing of playback of content obtained by image recording and sound recording in the communication system 1a will be described with reference to FIG. 24. FIG. 24 is a sequence diagram illustrating processing of playback of content obtained by image recording and sound recording in the communication system. Here, participant A who participated at the time of image recording uses the communication terminal 9a to play back the content data obtained by image recording and sound recording.

S71: First, when the receiving unit 92 of the communication terminal 9a receives a login operation from user A by inputting user ID, password, etc., the communication unit 91 transmits a login request to communication control system 5. This request includes user ID and password of user A. Accordingly, in the communication control system 5, the communication unit 51 receives the login request, and the authentication unit 55 refers to the user/device management DB (see FIG. 14) to perform authentication. Hereinafter, the explanation will proceed by assuming that the user A is determined to be a legitimate access person by the login authentication.

Figure 29:
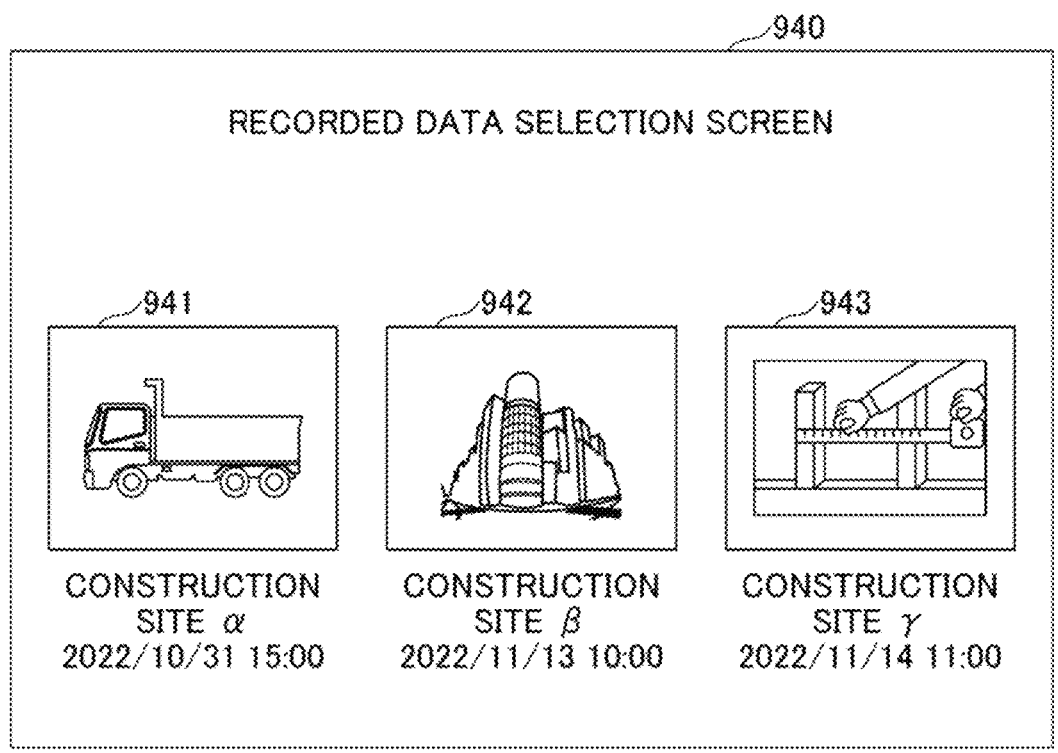
FIG. 29 illustrates a recorded data selection screen according to the first embodiment of the present invention.

S72: In the communication control system 5, the creating unit 53 creates a recorded data selection screen 940 as illustrated in FIG. 29. In this case, the storing/reading unit 59 searches the virtual room management DB 5002 (see FIG. 15) by using the user ID received in the processing in S71 as a search key, and reads all corresponding virtual room IDs, virtual room names, and content URLs. The creating unit 53 then creates each thumbnail 941, 942, and 943 by using an image from each piece of content data (with a time stamp) stored in the content URL. As a result, the creating unit 53 adds a virtual room name (such as "construction site a") and a recording time (such as "2022/10/31 15:00") indicating a predetermined time (for example, recording start time) of the time stamp for each thumbnail.

S73: The communication unit 51 transmits the selection screen data created in the processing in S72 to the communication terminal 9a. The selection screen data includes, in each thumbnail, a content ID for identifying the wide visual field image from which each thumbnail is created. Accordingly, the communication unit 91 of the communication terminal 9a receives the selection screen data.

S74: In the communication terminal 9a, the display control unit 94 displays the recorded data selection screen 940 illustrated in FIG. 29 on the display 507 of the communication terminal 9a. The receiving unit 92 receives specification (selection) of a predetermined thumbnail from a participant A. Here, the description continues by assuming that the thumbnail 941 is specified (selected).

S75: The communication unit 71 transmits a request to the communication control system 5 to download the content data from which the selected thumbnail 941 is created. The request includes the content ID associated with the thumbnail 941. As a result, the communication unit 51 of the communication control system 5 receives the request to download the content data.

S76: In the communication control system 5, the storing/reading unit 59 searches the virtual room management DB 5002 (see FIG. 15) by using the content ID received in the processing in S75 as a search key, and reads the content data from the corresponding content URL. Also, the storing/reading unit 59 reads the user ID, the angle of view information, and the information of the elapsed playback time (elapsed recording time) from the angle of view information management DB 5003 (see FIG. 16) stored in the angle of view information URL. Thus, the communication unit 91 of the communication terminal 9a receives the content data and the angle of view information of each user. The angle of view information includes a user ID and an elapsed playback time.

S77: In the communication terminal 9a, the display control unit 94 displays the image recorded on the display 507 of the communication terminal 9a, and the sound input/output control unit 95 performs playback processing. The recorded screen has the same display contents as in FIG. 25.

The processing at the communication terminal 9a can also be performed at the communication terminals 7 and 9b.

[Main Effect of the First Embodiment]

As described above, according to the embodiment, the display control unit 94 of the communication terminal 9a displays, in a superimposed manner, the guide icons 752x and 752b related to a predetermined area image (an example of the second predetermined area image) being displayed by other communication terminals on the map image M as illustrated in FIG. 26. This has the effect of making it easy for the user A to identify where other users X and B are viewing in the fully spherical image.

As illustrated in FIG. 26, the display control unit 94 of the communication terminal 9a displays, on the map image M in a superimposed manner, the guide icon 752a related to a predetermined area image (an example of the first predetermined area image) being displayed by the own terminal. As a result, the user A can easily identify which predetermined area of the fully spherical image the predetermined area image being viewed by the user corresponds to. Therefore, the problem of not knowing which predetermined area of the fully spherical image the predetermined area image currently being viewed by a predetermined user corresponds to, can be eliminated.

Further, as illustrated in FIG. 27, the display control unit 94 projects the fully spherical image from the zenith on the earth to create the azimuthal equidistant projection image 751p. As a result, compared with the case where the fully spherical image is projected from any point, the left and right directions (or bearings) of the guide icons 752x, 752a, and 752b, and the inner angles of the triangles of the guide icons 752x, 752a, and 752b on the center cp side can be displayed at angles corresponding to the angle of view of each predetermined area, thereby achieving an effect that is easy to understand by the viewing user.

Further, the display control unit 94 displays the vertical directions of the guide icons 752x, 752a, and 752b in a gradation, thereby achieving an effect that is easy to understand by the viewing user.

Second Embodiment

Next, the second embodiment will be described with reference to the drawings.

[Outline of the Communication System of the Second Embodiment]

Figure 30:
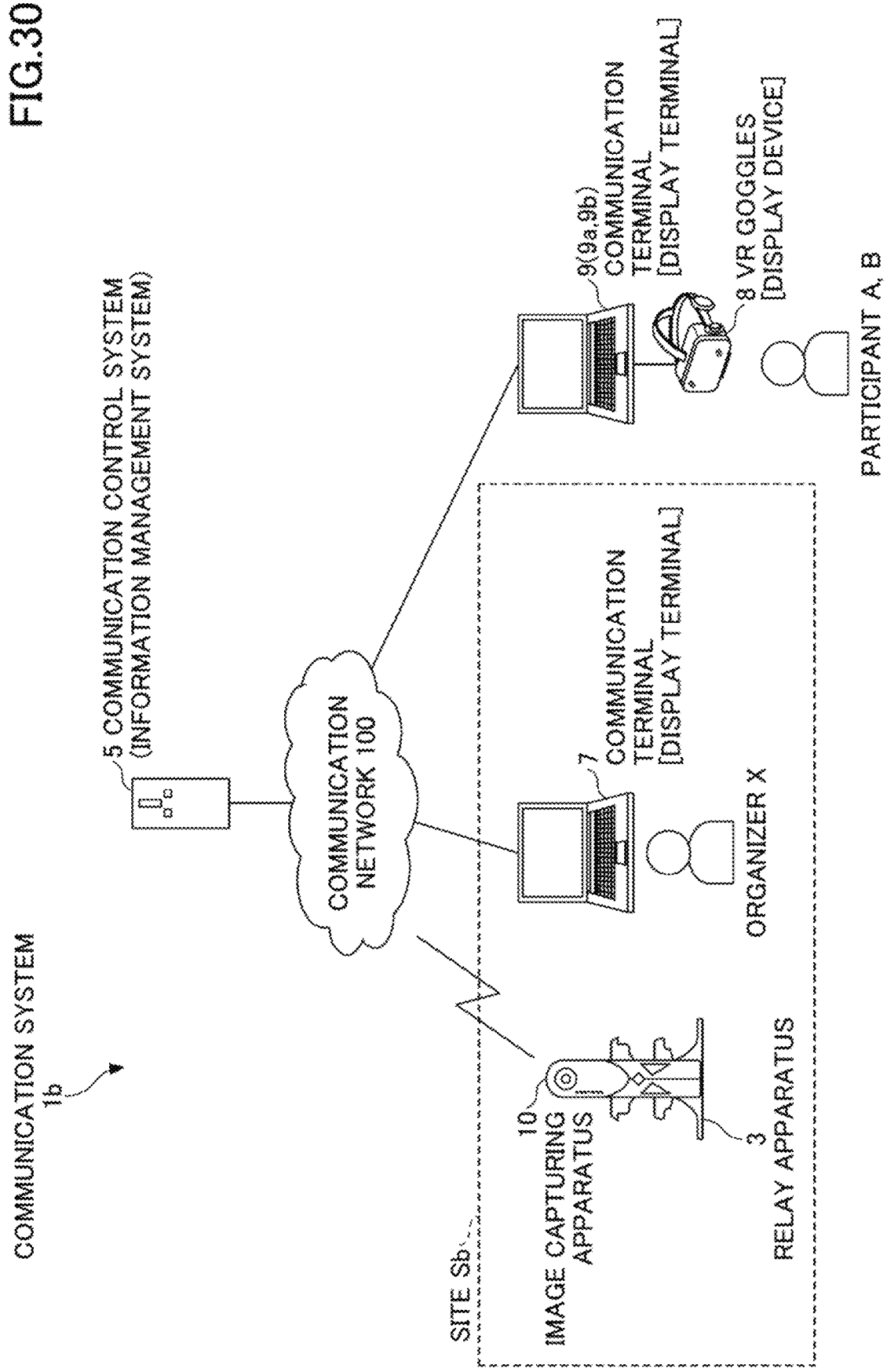
FIG. 30 is a conceptual diagram of a communication system according to a second embodiment of the present invention.

First, an outline of a communication system 1b according to the second embodiment will be described with reference to FIG. 30. FIG. 30 is a schematic diagram of the communication system according to the second embodiment.

As illustrated in FIG. 30, the communication system 1b of the present embodiment has a configuration in which VR (Virtual Reality) goggles 8 are added to the communication system 1a illustrated in FIG. 9. Here, the image capturing apparatus 10 and the relay apparatus 3 are installed at predetermined positions by the organizer X or the like at the site Sb such as a construction site, exhibition site, educational site, medical site, or the like.

The VR goggles 8 are connected to the communication terminal 9 in a wired or wireless manner, and can play back the content data received by the communication terminal 9.

[Hardware Configuration of the Second Embodiment]

Figure 31:
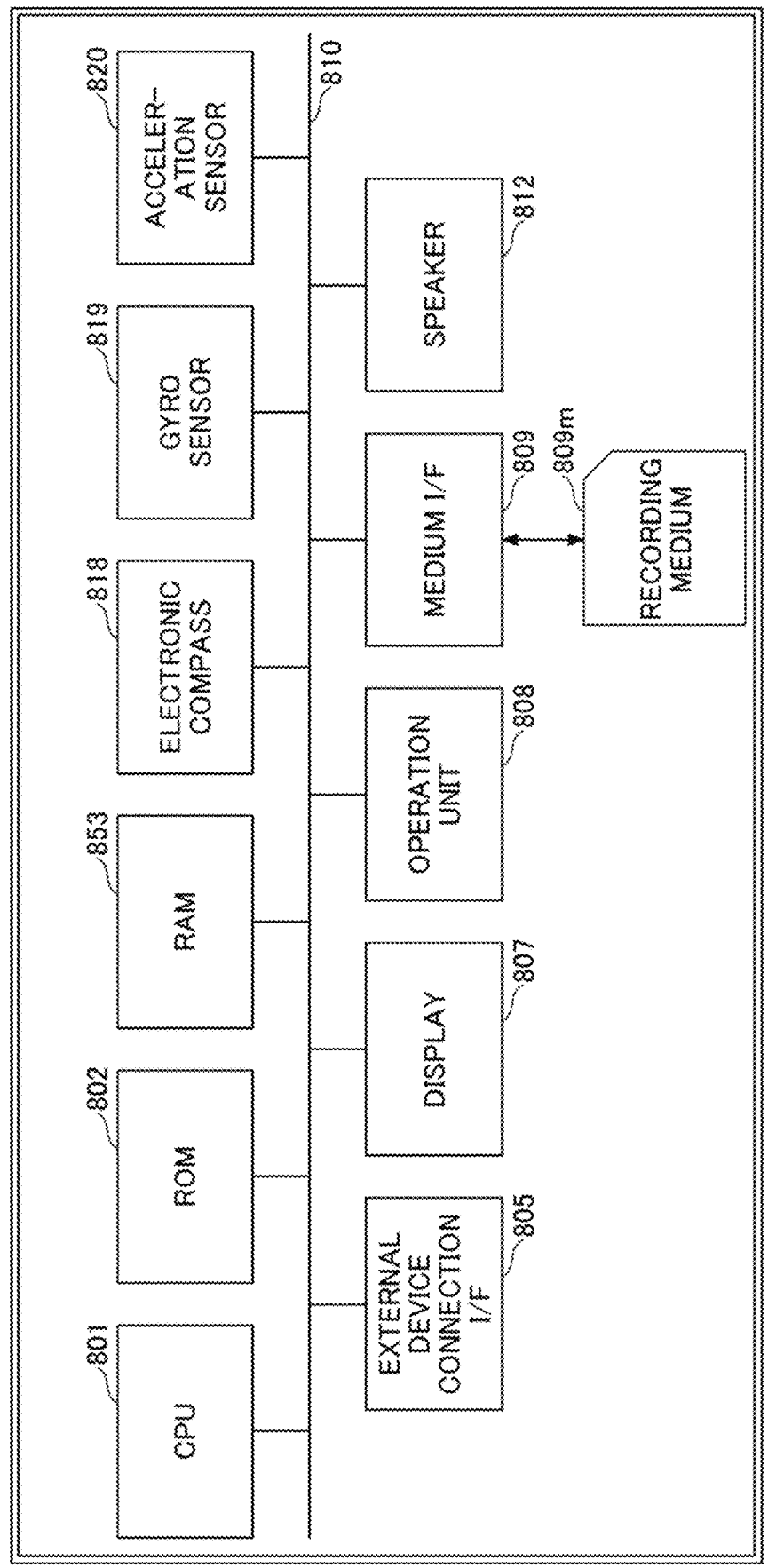
FIG. 31 is a hardware configuration diagram of VR goggles according to the second embodiment of the present invention.

The communication system 1b has the same devices (terminal, system) as the first embodiment except for the VR goggles 8, and, therefore, the hardware configuration of the VR goggles 8 will be described here. As illustrated in FIG. 31, the VR goggles 8 include, as a computer, a CPU 801, a ROM 802, a RAM 803, an external device connection I/F 805, a display 807, an operation unit 808, a medium I/F 809, a bus line 810, a speaker 812, an electronic compass 818, a gyro sensor 819, and an acceleration sensor 820.

Among these, the CPU 801 controls the operation of the entire VR goggles 8. The ROM 802 stores a program used for driving the CPU 801 such as the IPL. The RAM 803 is used as a work area of the CPU 801.

The external device connection I/F 805 is an interface for connecting various external devices. The external device in this case is a communication terminal 9 or the like.

The display 807 is a type of display unit such as a liquid crystal or an organic EL (Electro Luminescence) for displaying various images.

The operation unit 808 is an input unit including various operation buttons, a power switch, a physical button, a sight line operation circuit for detecting the user's sight line and performing an operation, etc., for selecting and executing various instructions, selecting a processing object, moving a cursor, etc.

The medium I/F 809 controls the reading or writing (storage) of data to a recording medium 809m such as a flash memory. The recording medium 809m also includes a DVD or a Blu-ray Disc (registered trademark).

The speaker 812 is a circuit that generates a sound such as music or speech sounds by changing an electric signal into a physical vibration.

The electronic compass 818 calculates the direction of the VR goggles 8 from the magnetic field of the earth and outputs the direction information.

The gyro sensor 819 is a sensor for detecting the change of the angle (roll angle, pitch angle, yaw angle) associated with the movement of the VR goggles 8.

The acceleration sensor 820 is a sensor for detecting acceleration in the triaxial direction.

The bus line 810 is an address bus, a data bus, or the like for electrically connecting each element such as the CPU 801.

<Usage Image of VR Goggles>

Figure 32:
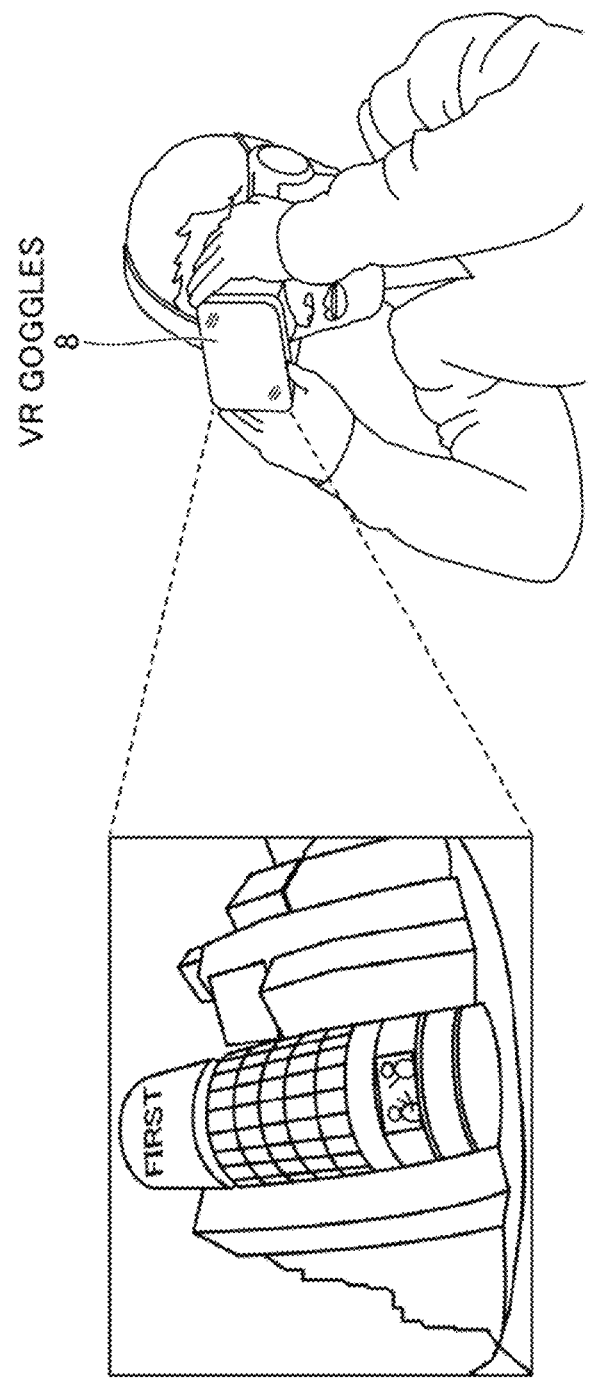
FIG. 32 is a usage image diagram of the VR goggles according to the second embodiment of the present invention.
Figure 33:
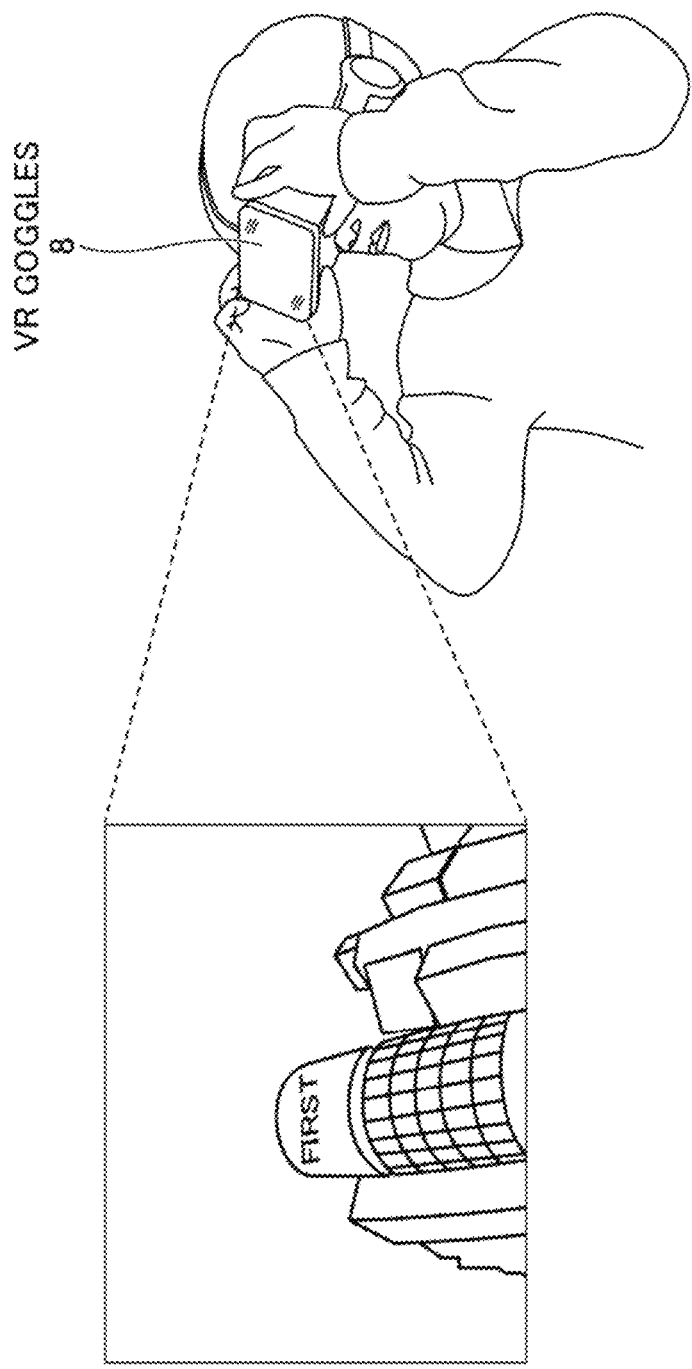
FIG. 33 is a usage image diagram of the VR goggles according to the second embodiment of the present invention.

Next, referring to FIGS. 32 and 33, an image of using the VR goggles 8 will be described. FIGS. 32 and 33 are images of using a VR scope.

When a user puts the VR goggles 8 connected to the communication terminal on his head and looks into the display 807 in the VR goggles 8, the user can see the VR image as illustrated in FIG. 32. As illustrated in FIG. 33, when the head of the user is turned upward while the user is wearing the VR goggles 8, the VR goggles 8 display a VR image on the upper side of the original VR image by the electronic compass 818, the gyro sensor 819, the acceleration sensor 820, and the like. Thus, the user can experience the feeling as if he/she is in the place represented by the image.

[Functional Configuration of the Second Embodiment]

Next, the functional configuration of the second embodiment will be described with reference to FIG. 34.

Figure 34:
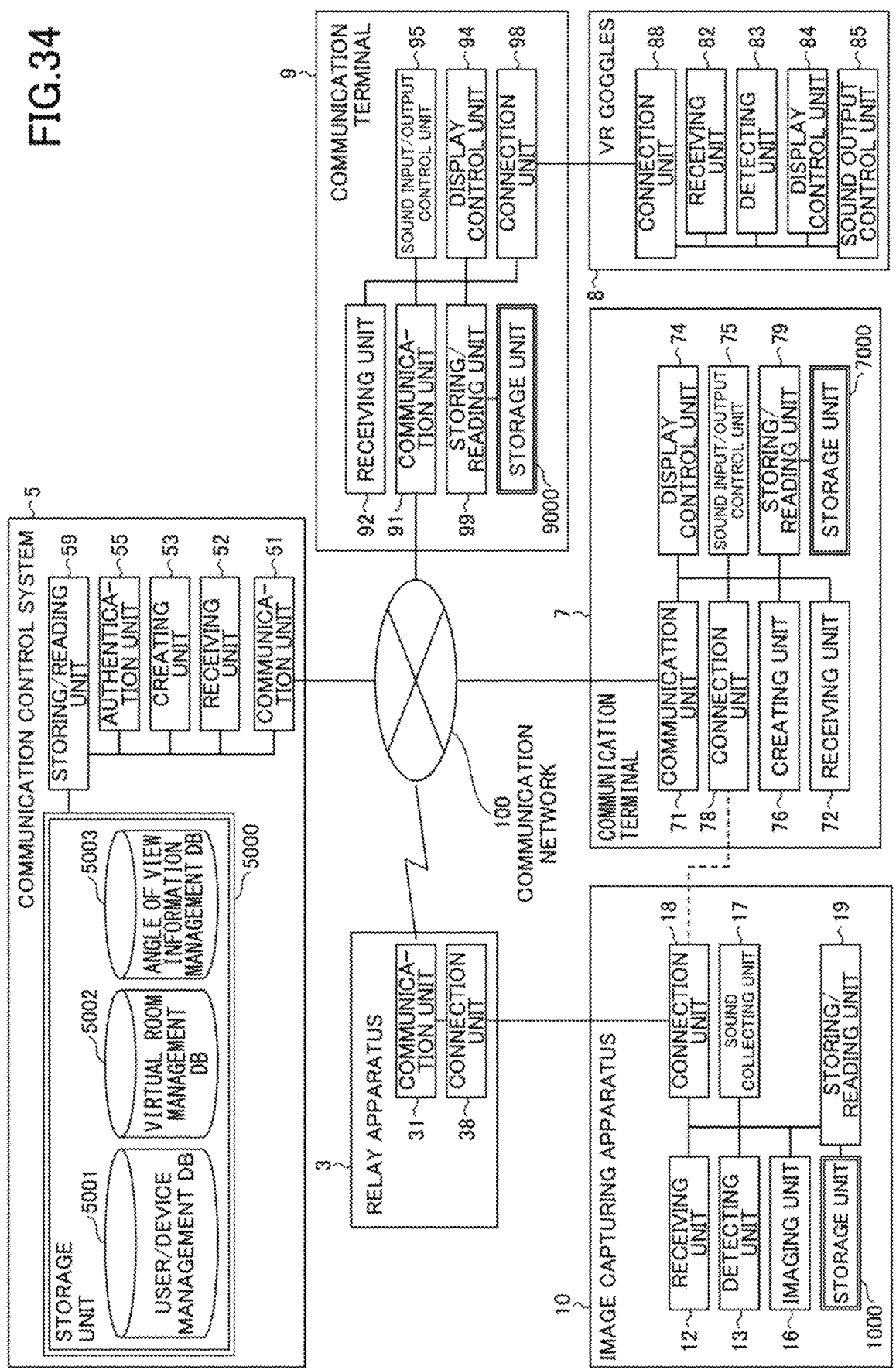
FIG. 34 is a functional configuration diagram of a communication system according to the second embodiment of the present invention.

FIG. 34 is a functional configuration diagram of the communication system according to the second embodiment.

In the second embodiment, only the VR goggles 8 are newly added to the first embodiment, so only the VR goggles 8 will be described below.

<Functional Configuration of VR Goggles>

As illustrated in FIG. 34, the VR goggles 8 includes a receiving unit 82, a detecting unit 83, a display control unit 84, a sound output control unit 85, and a connection unit 88. These units are functions or means that are implemented by operating any of the elements illustrated in FIG. 31 by instructions from the CPU 801 in accordance with a program for the VR goggles 8 loaded into the RAM 803.

The receiving unit 82 is implemented mainly by processing of the operation unit 808 with respect to the CPU 801 and receives an operation input from a user (here, the participant A). For example, the receiving unit 82 can receive input for enlargement or reduction of the predetermined area image being displayed. The receiving unit 82 also serves as an acquiring unit, and when the display of the predetermined area in the wide visual field image is received from the user, the receiving unit 82 acquires angle of view information for identifying the predetermined area.

The detecting unit 83 is implemented mainly by processing of each sensor (the electronic compass 818, the gyro sensor 819, the acceleration sensor 820) with respect to the CPU 801. For example, by changing the direction of the head of the user while the user is wearing the VR goggles 8, the detecting unit 83 detects a change in a predetermined area as illustrated in FIGS. 6A to 6C.

The display control unit 84 is mainly implemented by processing of the CPU 801, and performs control for displaying various images on the display 807 of the VR goggles 8 based on content data (wide visual field image and sound information) acquired from the outside through the connection unit 88.

The sound output control unit 85 is mainly implemented by processing of the CPU 801, and performs control for outputting sound to the speaker 812.

[Processing or Operation of the Second Embodiment]

Figure 35:
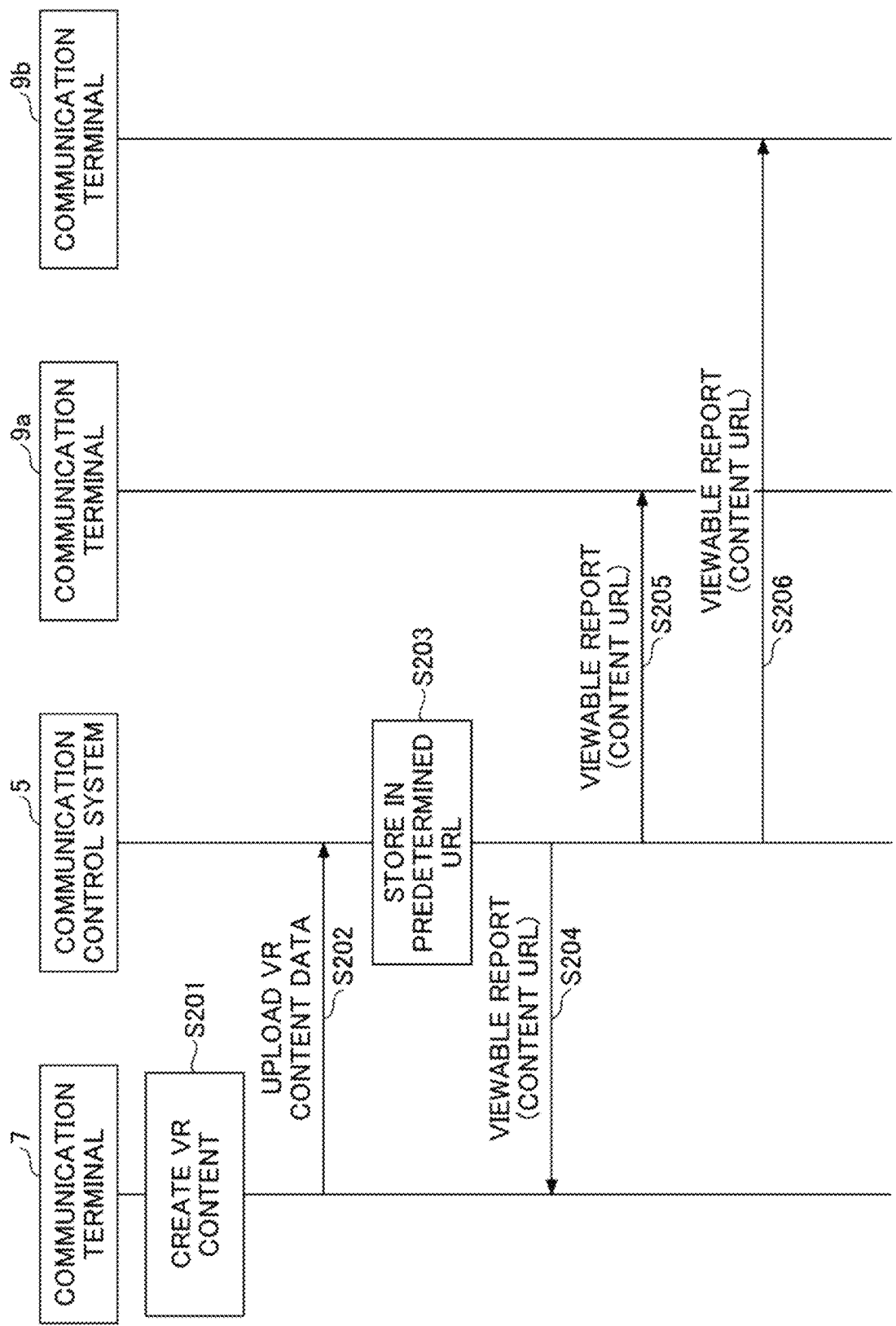
FIG. 35 is a sequence diagram illustrating processing of sharing VR content in a communication system according to the second embodiment of the present invention.

Next, the processing or operation of the second embodiment will be described with reference to FIG. 35. FIG. 35 is a sequence diagram illustrating the processing of sharing VR contents in a communication system.

The processing described below describes the processing in which the communication terminal 7 creates VR contents such as educational materials (VR wide visual field images, sound information) by using the content data obtained by image recording and sound recording in the processing S36 and the information stored in the angle of view information management DB 7001 of the storage unit 7000.

S201: First, the receiving unit 72 receives inputs such as a narration and a ticker by the organizer X, with respect to the content data already obtained by image recording and sound recording. Accordingly, the creating unit 76 creates the content data.

S202: The communication unit 71 uploads (transmits) the VR content data obtained by image recording and sound recording to the predetermined content URL (the communication control system 5) received in the processing in S33, etc. The VR content data includes the elapsed playback time from the start to the end of the image recording and sound recording. Accordingly, in the communication control system 5, the communication unit 51 receives the VR content data.

S203: In the communication control system 5, the storing/reading unit 59 stores the VR content data in a predetermined content URL together with the elapsed playback time.

S204: The communication unit 51 transmits a viewable report indicating that the VR content can be viewed, to the communication terminal 7. The report includes information indicating a predetermined content URL. Accordingly, the communication unit 71 of the communication terminal 7 receives the viewable report.

S205: Similarly, the communication unit 51 transmits the viewable report to the communication terminal 9a. The report includes information indicating a predetermined VR content URL. Accordingly, the communication unit 91 of the communication terminal 9a receives the viewable report.

S206: Similarly, the communication unit 51 transmits the viewable report to the communication terminal 9b. The report includes information indicating a predetermined content URL. Accordingly, the communication unit 91 of the communication terminal 9b receives the viewable report.

In the case of the processing S204, it is not necessary to include the predetermined content URL in the viewable report.

Figure 36:
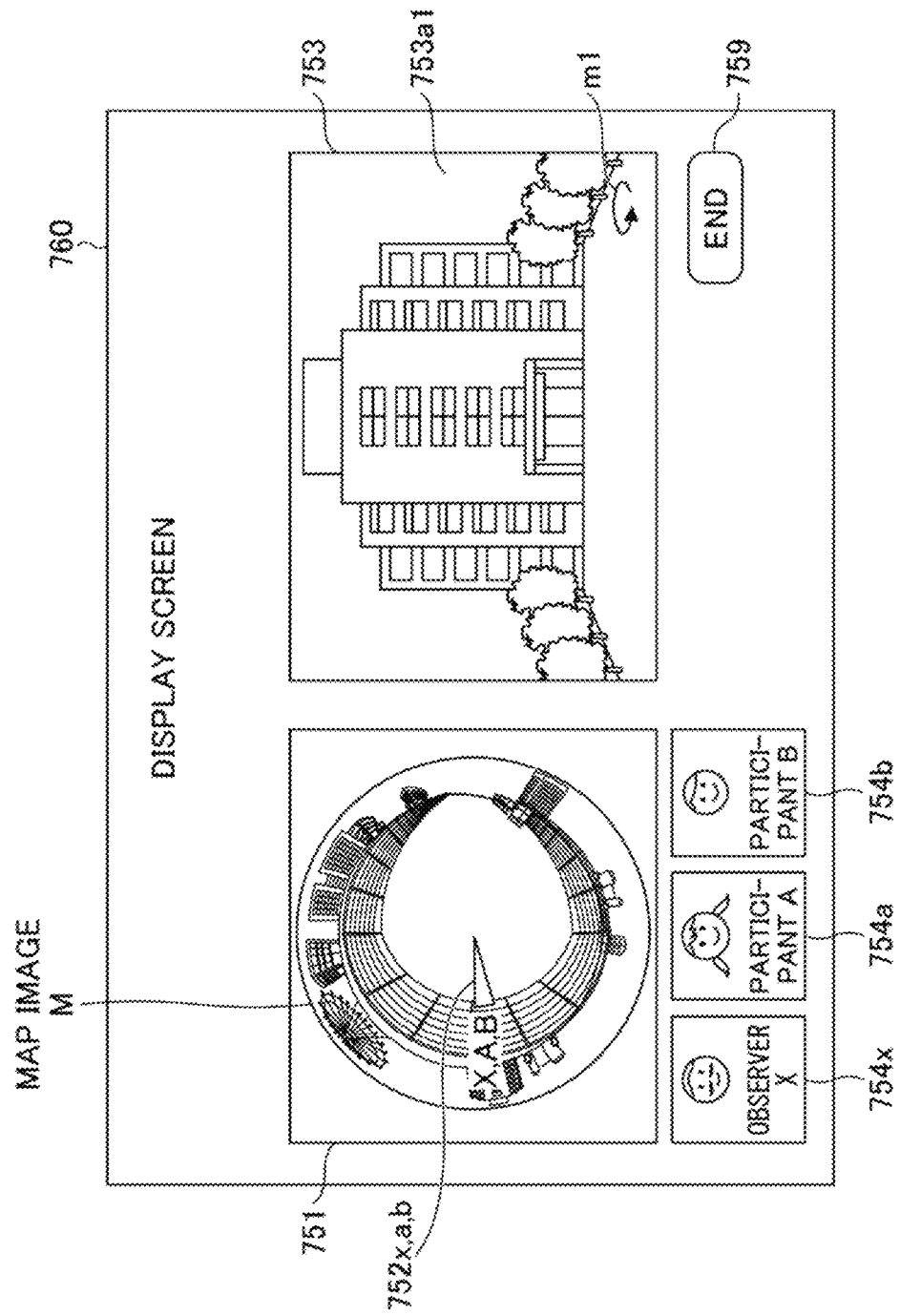
FIG. 36 is a diagram illustrating a recording and playback screen displayed on VR goggles according to the second embodiment of the present invention.

Thus, the user A receives VR content data and angle of view information (including the elapsed playback time) from the communication control system 5 by using the communication terminal 9a. Then, the display control unit 94 of the communication terminal 9a generates a record/playback screen 760 as illustrated in FIG. 36. Further, the user A connects the VR goggles 8 to the communication terminal 9a, so that in the VR goggles 8, the connection unit 88 acquires the data of the record/playback screen 760 from the connection unit 98 of the communication terminal 9a, and the display control unit 84 displays the record/playback screen 760 as illustrated in FIG. 36 on the display 807. That is, the display control unit 94 displays the record/playback screen 760 on the display 807 through the display control unit 84. The record/playback screen 760 is basically the same image as the display screen illustrated in FIG. 25, and includes a narration, a ticker, and the like. Here, the display screen 750 displayed by the user A at the time of recording is played back at the time of playing back the recorded content in order to confirm the content again. When the participant A moves as illustrated in FIGS. 32 to 33, a predetermined area image 753al in the display area 753 of the record/playback screen 760 illustrated in FIG. 36 is changed, and the position (direction) and size of the guide icon 752a are also changed accordingly.

[Main Effect of the Second Embodiment]

As described above, according to the present embodiment, in addition to the effect of the first embodiment, it is also possible to view VR contents.

Further, the VR content includes a narration, a ticker, etc., and, therefore, the user (here, the user A) can also use the VR content as educational material.

[Supplement]

Although embodiments have been described above, the present invention is not limited to such embodiments, and various changes and substitutions can be made within the scope not departing from the gist of the present invention.

(1) The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

(2) The (non-transitory) recording medium, such as a DVD-ROM, on which each of the above program is stored may be provided as a program product in Japan or abroad.

(3) The CPU 111, 301, 501, and 801 serving as a processor may each be plural.

Figure 37:
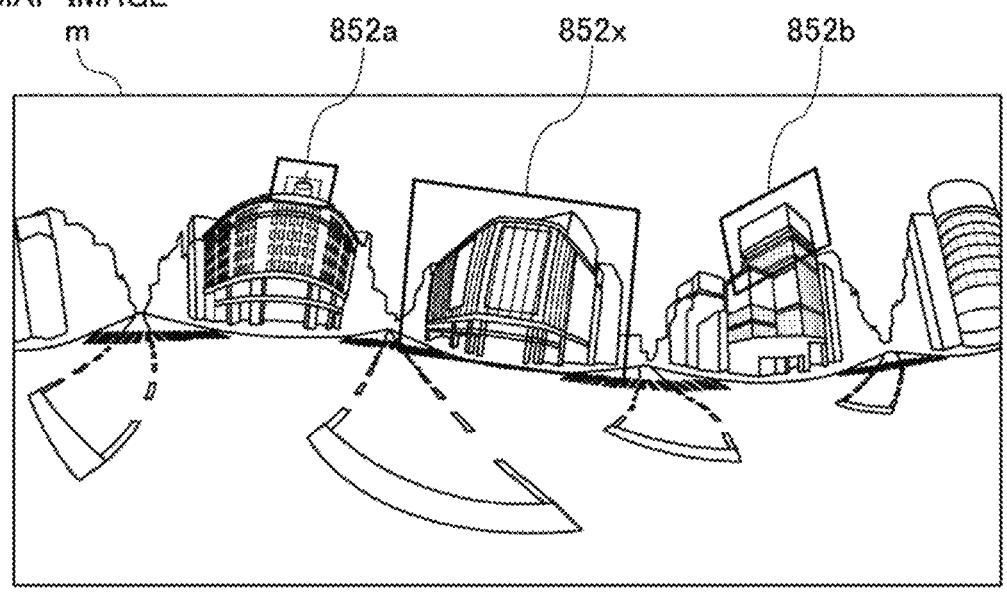
FIG. 37 is a diagram illustrating another example of a map image according to an embodiment of the present invention.

(4) In the above embodiments, the map image M has been described as an example of an azimuthal equidistant projection image of a fully spherical image. The map image M is not limited thereto. For example, an equirectangular projection image as illustrated in FIG. 3C may be used. FIG. 37 illustrates a map image m as an example of a map image M. As illustrated in FIG. 37, a guide icon 852x relating to a predetermined area image displayed by the communication terminal 7 of the user X, a guide icon 852a relating to a predetermined area image displayed by the communication terminal 9a of the user A, and a guide icon 852b relating to a predetermined area image displayed by the communication terminal 9b of the user A are shown on the map image m. In this case, the shape of the predetermined area indicating the predetermined area image becomes the shape of the guide icon. When the predetermined area is expressed on the equirectangular projection image, the predetermined area becomes a diamond shape as illustrated in FIG. 37.

(5) In each of the above embodiments, a case in which the processes illustrated in FIGS. 19 to 22 are executed at the time of video recording and sound recording has been described, but the embodiment is not limited to the case of video recording and sound recording.

SUPPLEMENTARY NOTES

The above embodiments may be described as follows.

Supplementary Note 1

A display terminal for displaying a predetermined area image of a predetermined area in a fully spherical image, on a display, the display terminal including a display control unit for displaying an azimuthal equidistant projection image of the fully spherical image, and displaying on the azimuthal equidistant projection image an angle of view display area having a shape indicating an angle of view to the predetermined area from the center of the azimuthal equidistant projection image; and a receiving unit for receiving an instruction to change the predetermined area of the predetermined area image, wherein the display terminal changes and displays the predetermined area image and changes and displays the angle of view display area based on the instruction received by the receiving unit.

Supplementary Note 2

The display terminal according to Supplementary Note 1, wherein the shape indicating the angle of view is a triangle with the center of the azimuthal equidistant projection image as one vertex, and the inner angle at the one vertex is an angle corresponding to the angle of view.

According to the present disclosure, it is possible to easily identify which part of the wide visual field image is viewed by the users including oneself.

What is claimed is:

1. A display terminal configured to display a predetermined area image of a predetermined area in a wide visual field image, the display terminal comprising:
   circuitry; and
   a memory storing computer-executable instructions that cause the circuitry to execute:
   displaying, on a display, a first predetermined area image of a first predetermined area in the wide visual field image, and the wide visual field image, wherein
   the displaying includes displaying a display area corresponding to the first predetermined area on the wide visual field image displayed on the display,
   wherein the circuitry is further caused to execute:
   receiving area information for identifying a second predetermined area in the wide visual field image,
   wherein:
   the displaying includes displaying a display area relating to another display terminal on the wide visual field image, based on the received area information,
   in a case where the wide visual field image is a fully spherical image, the displaying includes displaying an azimuthal equidistant projection image of the fully spherical image to display the wide visual field image, and
   the area information is angle of view information for identifying the predetermined area in the wide visual field image.

2. The display terminal according to claim 1, wherein;
   the displaying includes creating the azimuthal equidistant projection image by projecting the fully spherical image from a zenith of the earth.

3. The display terminal according to claim 1, wherein;
   the display area corresponding to the first predetermined area has a shape indicating an angle of view from a center of the azimuthal equidistant projection image to the second predetermined area.

4. The display terminal according to claim 3, wherein;
   the display area corresponding to the first predetermined area is expressed by gradation from the center of the azimuthal equidistant projection image to the second predetermined area, according to a latitude of a position of the second predetermined area in the fully spherical image.

5. The display terminal according to claim 4, wherein;
   in a case where the position of the second predetermined area in the fully spherical image is at a higher latitude than an equator in the fully spherical image, the gradation is such that a brightness increases as the second predetermined area is approached from the center of the azimuthal equidistant projection image.

6. The display terminal according to claim 4, wherein;
   in a case where the position of the second predetermined area in the fully spherical image is at a lower latitude than an equator in the fully spherical image, the gradation is such that a brightness decreases as the second predetermined area is approached from the center of the azimuthal equidistant projection image.

7. The display terminal according to claim 3, wherein;
   the shape indicating the angle of view is a triangle in which one vertex corresponds to the center of the azimuthal equidistant projection image, and an inner angle of the one vertex is an angle corresponding to the angle of view.

8. A communication system comprising:
an image capturing apparatus configured to obtain a fully spherical image by image capturing; and
a display terminal configured to display a predetermined area image of a predetermined area in the fully spherical image, wherein
the image capturing apparatus includes:
first circuitry; and
a first memory storing computer-executable instructions that cause the first circuitry to execute:
detecting an attitude of the image capturing apparatus to obtain attitude information; and
outputting the fully spherical image and the attitude information, and wherein
the display terminal includes:
second circuitry; and
a second memory storing computer-executable instructions that cause the second circuitry to execute:
receiving the fully spherical image and the attitude information output by the image capturing apparatus; and
displaying an azimuthal equidistant projection image obtained by projecting the fully spherical image based on the received fully spherical image and the received attitude information, and displaying a display area corresponding to the predetermined area in the fully spherical image on the azimuthal equidistant projection image.

9. A display method executed by a display terminal configured to display a predetermined area image of a predetermined area in a wide visual field image, the display method comprising:
displaying, on a display, a first predetermined area image of a first predetermined area in the wide visual field image, and the wide visual field image, wherein
the displaying includes displaying a display area corresponding to the first predetermined area on the wide visual field image displayed on the display,
wherein the display method further comprises:
receiving area information for identifying a second predetermined area in the wide visual field image,
wherein:
the displaying includes displaying a display area relating to another display terminal on the wide visual field image, based on the received area information,
in a case where the wide visual field image is a fully spherical image, the displaying includes displaying an azimuthal equidistant projection image of the fully spherical image to display the wide visual field image, and
the area information is angle of view information for identifying the predetermined area in the wide visual field image.

10. The display method according to claim 9, wherein:
the displaying includes creating the azimuthal equidistant projection image by projecting the fully spherical image from a zenith of the earth.

11. The display method according to claim 9, wherein:
the display area corresponding to the first predetermined area has a shape indicating an angle of view from a center of the azimuthal equidistant projection image to the second predetermined area.

12. The display method according to claim 11, wherein:
the display area corresponding to the first predetermined area is expressed by gradation from the center of the azimuthal equidistant projection image to the second predetermined area, according to a latitude of a position of the second predetermined area in the fully spherical image.

13. The display method according to claim 12, wherein:
in a case where the position of the second predetermined area in the fully spherical image is at a higher latitude than an equator in the fully spherical image, the gradation is such that a brightness increases as the second predetermined area is approached from the center of the azimuthal equidistant projection image.

14. The display method according to claim 13, wherein:
the shape indicating the angle of view is a triangle in which one vertex corresponds to the center of the azimuthal equidistant projection image, and an inner angle of the one vertex is an angle corresponding to the angle of view.

15. The display method according to claim 12, wherein:
in a case where the position of the second predetermined area in the fully spherical image is at a lower latitude than an equator in the fully spherical image, the gradation is such that a brightness decreases as the second predetermined area is approached from the center of the azimuthal equidistant projection image.

16. A non-transitory computer-readable recording medium storing a program that causes a computer to execute a process for displaying a predetermined area image of a predetermined area in a wide visual field image, the process comprising:
displaying, on a display, a first predetermined area image of a first predetermined area in the wide visual field image, and the wide visual field image, wherein
the displaying includes displaying a display area corresponding to the first predetermined area on the wide visual field image displayed on the display,
wherein the processing further comprises:
receiving area information for identifying a second predetermined area in the wide visual field image,
wherein:
the displaying includes displaying a display area relating to another display terminal on the wide visual field image, based on the received area information,
in a case where the wide visual field image is a fully spherical image, the displaying includes displaying an azimuthal equidistant projection image of the fully spherical image to display the wide visual field image, and
the area information is angle of view information for identifying the predetermined area in the wide visual field image.

17. The non-transitory computer-readable recording medium according to claim 16, wherein:
the displaying includes creating the azimuthal equidistant projection image by projecting the fully spherical image from a zenith of the earth.

18. The non-transitory computer-readable recording medium according to claim 16, wherein:
the display area corresponding to the first predetermined area has a shape indicating an angle of view from a center of the azimuthal equidistant projection image to the second predetermined area.

19. The non-transitory computer-readable recording medium according to claim 18, wherein:
the display area corresponding to the first predetermined area is expressed by gradation from the center of the azimuthal equidistant projection image to the second predetermined area, according to a latitude of a position of the second predetermined area in the fully spherical image.

20. The non-transitory computer-readable recording medium according to claim 19, wherein:
   in a case where the position of the second predetermined area in the fully spherical image is at a higher latitude than an equator in the fully spherical image, the gradation is such that a brightness increases as the second predetermined area is approached from the center of the azimuthal equidistant projection image.

* * * * *